(12) United States Patent  (10) Patent No.: US 7,043,877 B1
Jensen                      (45) Date of Patent:     May 16, 2006

(54) STACKABLE PLANTER

(75) Inventor: Jon F. Jensen, Richmond, UT (US)

(73) Assignees: Daugs, Ammon, Mendon, UT (US);
Uhl, Michael, Mendon, UT (US)

( * ) Notice: Subject to any disclaimer, the term of this patent is extended or adjusted under 35 U.S.C. 154(b) by 0 days.

(21) Appl. No.: 10/715,254

(22) Filed: Nov. 17, 2003

Related U.S. Application Data

(60) Provisional application No. 60/427,128, filed on Nov. 15, 2002.

(51) Int. Cl.
*A01G 9/02*  (2006.01)

(52) U.S. Cl. ............................................. 47/83; 47/82

(58) Field of Classification Search ............... 47/82, 47/83, 65.5, 86; 206/561, 564, 511, 512, 206/499, 503, 508, 509
See application file for complete search history.

(56) References Cited

U.S. PATENT DOCUMENTS

| | | | | |
|---|---|---|---|---|
| 2,670,571 | A | * | 3/1954 | Waldron ........................ 47/83 |
| 3,252,252 | A | | 5/1966 | Muelberger, Jr. |
| 3,368,303 | A | * | 2/1968 | Tong ......................... 47/41.12 |
| 3,686,791 | A | * | 8/1972 | Mills ............................. 47/83 |
| 4,355,485 | A | * | 10/1982 | Frank ............................ 47/82 |
| 4,419,843 | A | | 12/1983 | Johnson, Sr. |
| D285,265 | S | | 8/1986 | Pas |
| 4,614,056 | A | * | 9/1986 | Farkas ........................... 47/67 |
| 4,779,378 | A | * | 10/1988 | Mason, Jr. ..................... 47/83 |
| 4,788,792 | A | * | 12/1988 | Womick .................... 47/41.12 |
| 5,305,551 | A | | 4/1994 | Orlov |
| 5,309,671 | A | | 5/1994 | Byun |
| 5,404,672 | A | * | 4/1995 | Sanderson ..................... 47/82 |
| 5,440,836 | A | * | 8/1995 | Lee ............................... 47/60 |
| 5,533,302 | A | * | 7/1996 | Lynch et al. .................. 47/82 |
| 6,092,333 | A | * | 7/2000 | Steffan ........................... 47/83 |
| 6,470,625 | B1 | * | 10/2002 | Byun ............................. 47/82 |
| 6,612,073 | B1 | * | 9/2003 | Powell et al. .................. 47/83 |
| 6,684,565 | B1 | * | 2/2004 | Kemp et al. ................... 47/83 |

FOREIGN PATENT DOCUMENTS

| | | | | |
|---|---|---|---|---|
| DE | 3420037 | A1 | * | 12/1985 |
| DE | 3618833 | A1 | * | 12/1987 |
| EP | 98474 | A2 | * | 1/1984 |
| EP | 142471 | A2 | * | 5/1985 |
| FR | 2550073 | A1 | * | 2/1985 |
| GB | 2173984 | A | * | 10/1986 |
| GB | 2278989 | A | * | 12/1994 |
| JP | 2003230319 | A | * | 8/2003 |
| WO | WO 98/56233 | | * | 12/1998 |

* cited by examiner

OTHER PUBLICATIONS

English translation of FR2550073 (on PTO-892 mailed on Feb. 4, 2005.*

*Primary Examiner*—Son T. Nguyen
(74) *Attorney, Agent, or Firm*—Christensen O'Connor Johnson Kindness PLLC

(57)  ABSTRACT

A stackable planter comprising a plurality of planter trays has planter cups at a periphery for holding soil and plants. An inner rib of each planter tray defines a center portion of the planter tray. The center portion of one of the planter trays has a bottom wall that extends across the center portion and defines a recess for holding soil, whereby one or more plants may be planted in the center of the stackable planter. The planter trays are shaped to nest within one another when in a collapsed configuration. The stackable planter may be used indoors or outdoors and is portable in nature. Further configurations of the planter may provide a watering device with features configured to fit within the center portion of a planter trays.

17 Claims, 38 Drawing Sheets

STACKABLE PLANTER

CROSS-REFERENCE TO RELATED APPLICATION

This application claims the benefit of U.S. Provisional Patent Application No. 60/427,128, filed Nov. 15, 2002, the entire disclosure of which is incorporated by reference herein.

FIELD OF THE INVENTION

The present invention relates to a modular, stackable planter that may be used indoors or outdoors for planting.

BACKGROUND OF THE INVENTION

Multi-tier, stackable planters are generally known in the art. While planters comprised of stackable units have been shown capable of holding multiple plants at a periphery of the planter units, none of the prior art planters provide a system that is useful for decorating or concealing a large post, tree, or the like, nor have prior art planters provided a system that includes a central recess feature for adding a larger plant to the center of the planter, when assembled in a stacked condition. The present invention is directed to a modular, stackable planter system that addresses these needs and other deficiencies in prior art planters.

SUMMARY OF THE INVENTION

The present invention provides a stackable planter comprised of one or more trays that may be used separately or in a stacked configuration for growing plants. In one aspect, a stackable planter provided by the present invention may be used as a complete system or as individual components for providing landscape elements, such as terracing, borders, a tree ring-guard, a freestanding structure, mailbox base, for decoration or concealment of posts, hydrants, property markers, etc. The planter may be used to grow a variety of plants, including herbs, flowers, strawberries, ground covers, cactus, etc.

A stackable planter constructed according to the invention may be used indoors or outdoors and is portable in nature. The color, style, stack height, number and/or shape of planting cups on the periphery of the planting trays comprising the stackable planter may vary in accordance with particular application requirements. Moreover, embodiments of the invention may be constructed for use on the ground or for suspended use. In either case, mechanisms for interlocking the trays may be provided.

In accordance with another aspect of the invention, a center portion of a planter tray is configured with either an open aperture or a filled recess that is sized for receiving soil and a larger plant in the center of the planter. Further configurations of the invention may provide an automatic watering device with features configured to fit within the center portion of a planter tray.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following description provides an overview and detailed description of several preferred embodiments of a stackable planter constructed in accordance with the present invention. While illustrative examples are described herein, these examples are not intended to be exhaustive or to limit the invention to the precise forms disclosed. Similarly, any process steps described herein, e.g., for assembling or configuring an embodiment of the present invention, may be interchangeable with other steps, or several combinations of steps, in order to achieve the benefits and advantages of the invention.

Figure 1:
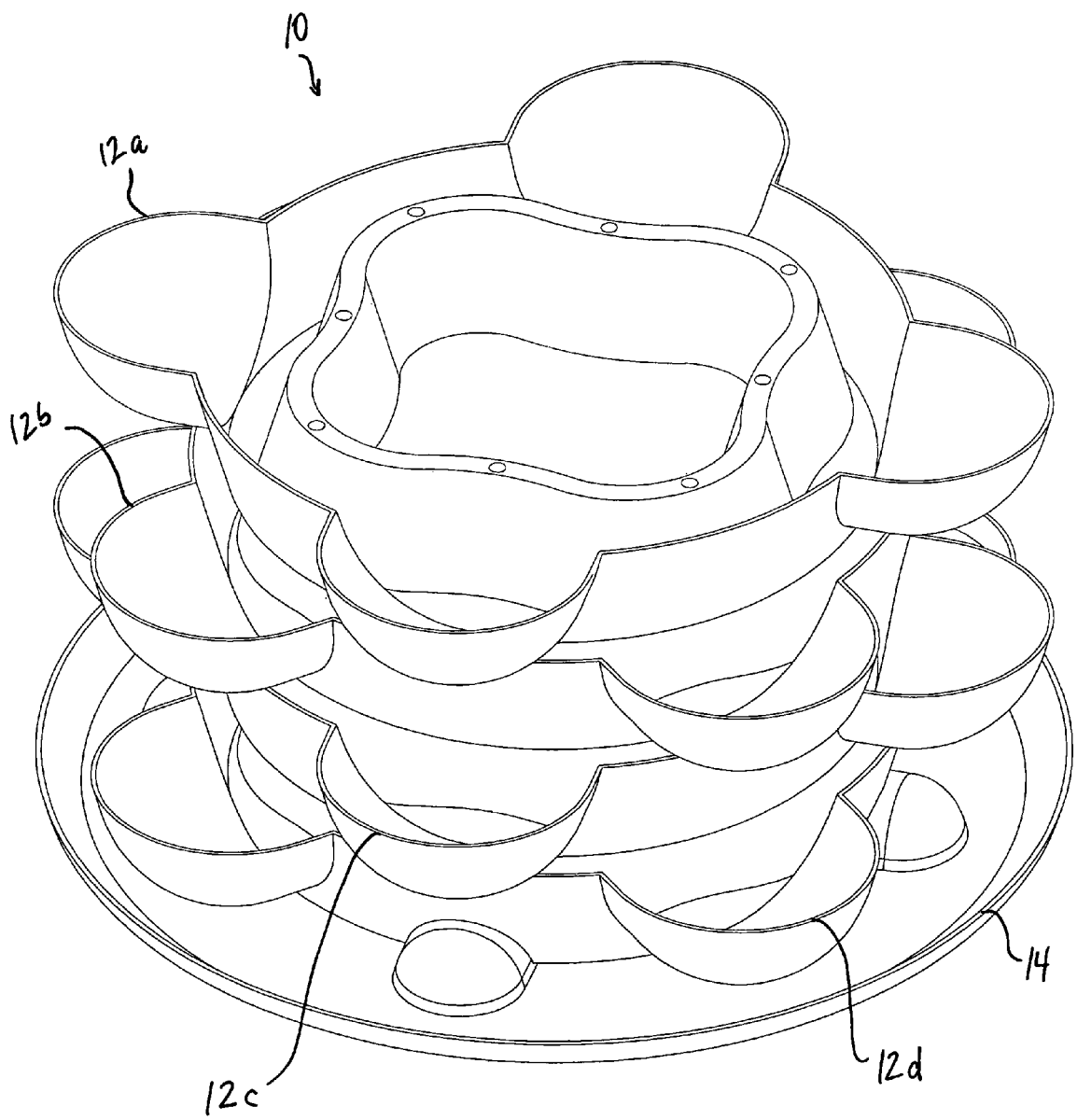
FIG. 1 is a top perspective view of a stackable planter constructed according to one exemplary embodiment of the invention, in which the stackable planter is comprised of four trays and a cart in a stacked configuration.
Figure 2:
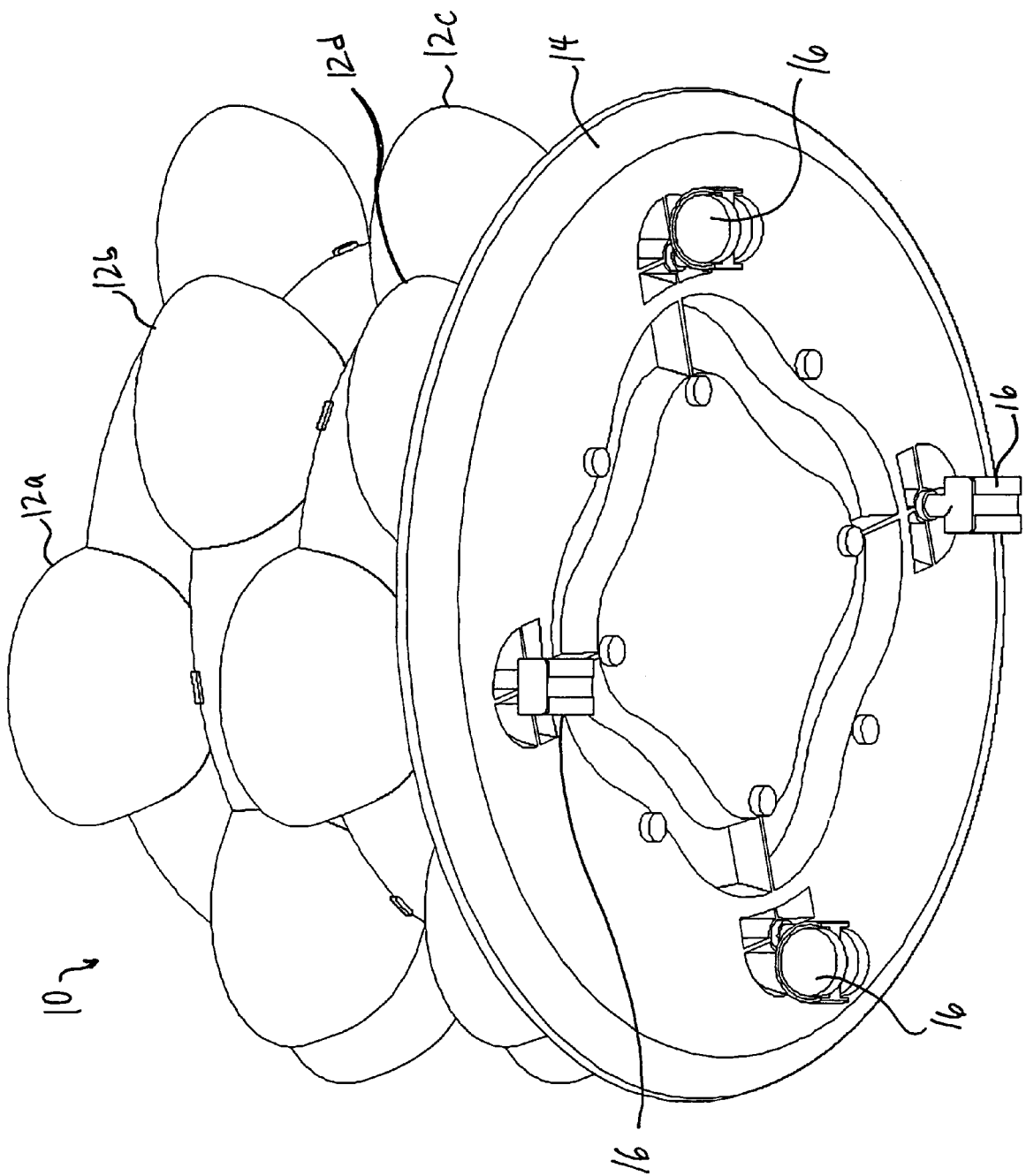
FIG. 2 is a bottom perspective view of the planter shown in FIG. 1 with wheels attached to the cart.
Figure 3:
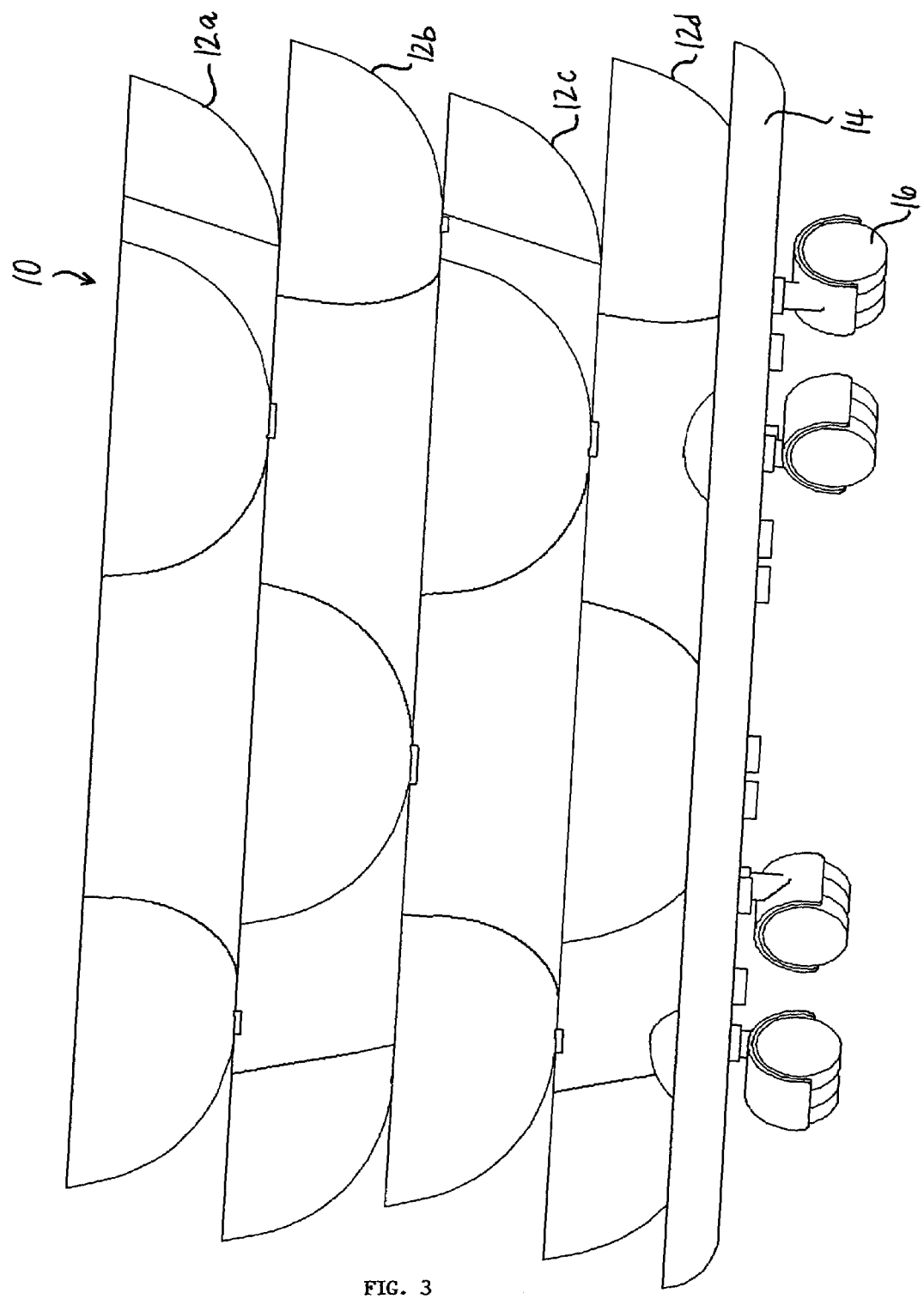
FIG. 3 is a side elevation view of the planter shown in FIG. 1 with wheels attached to the cart.
Figure 4:
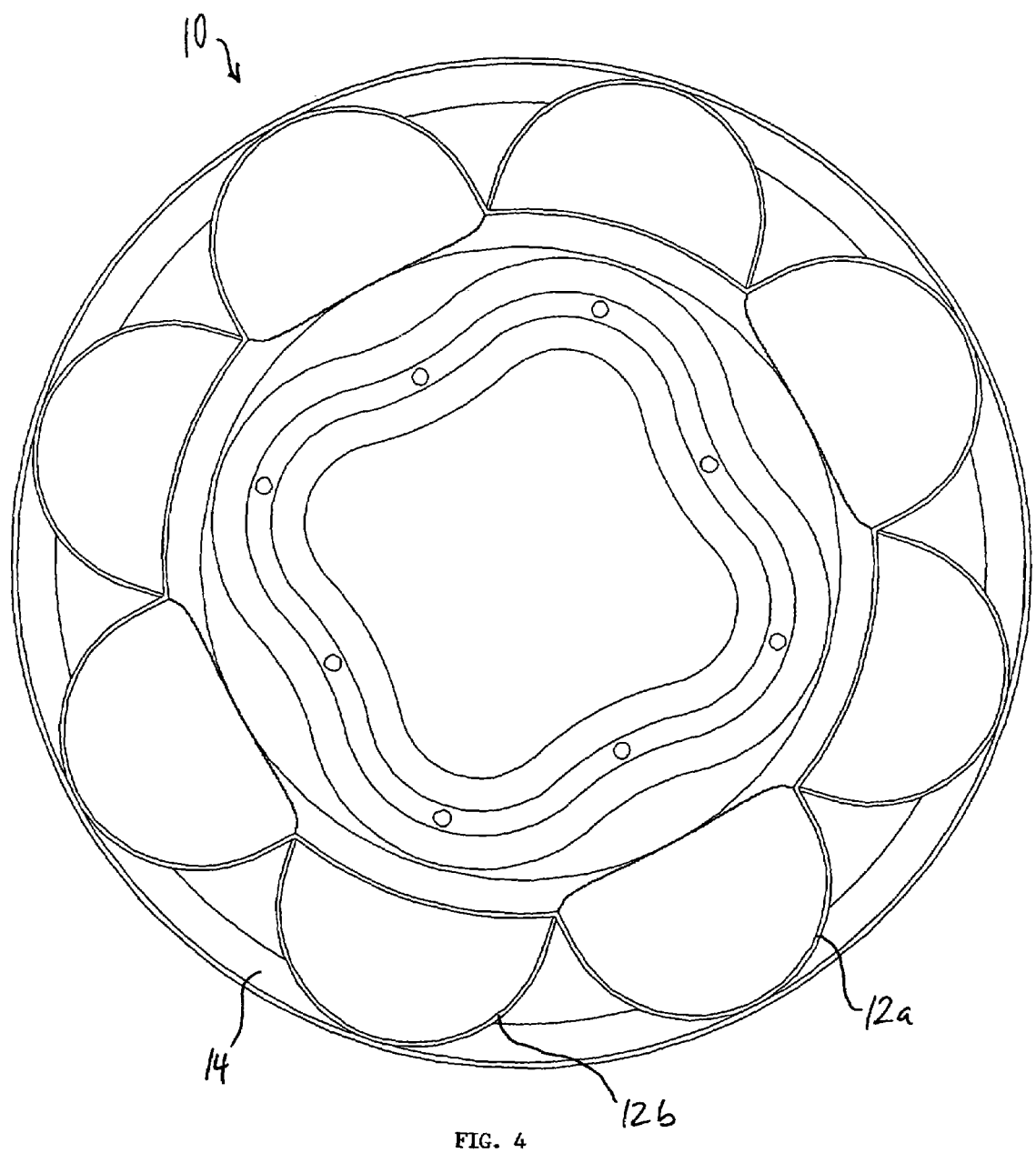
FIG. 4 is a top plan view of the planter shown in FIG. 1.
Figure 5:
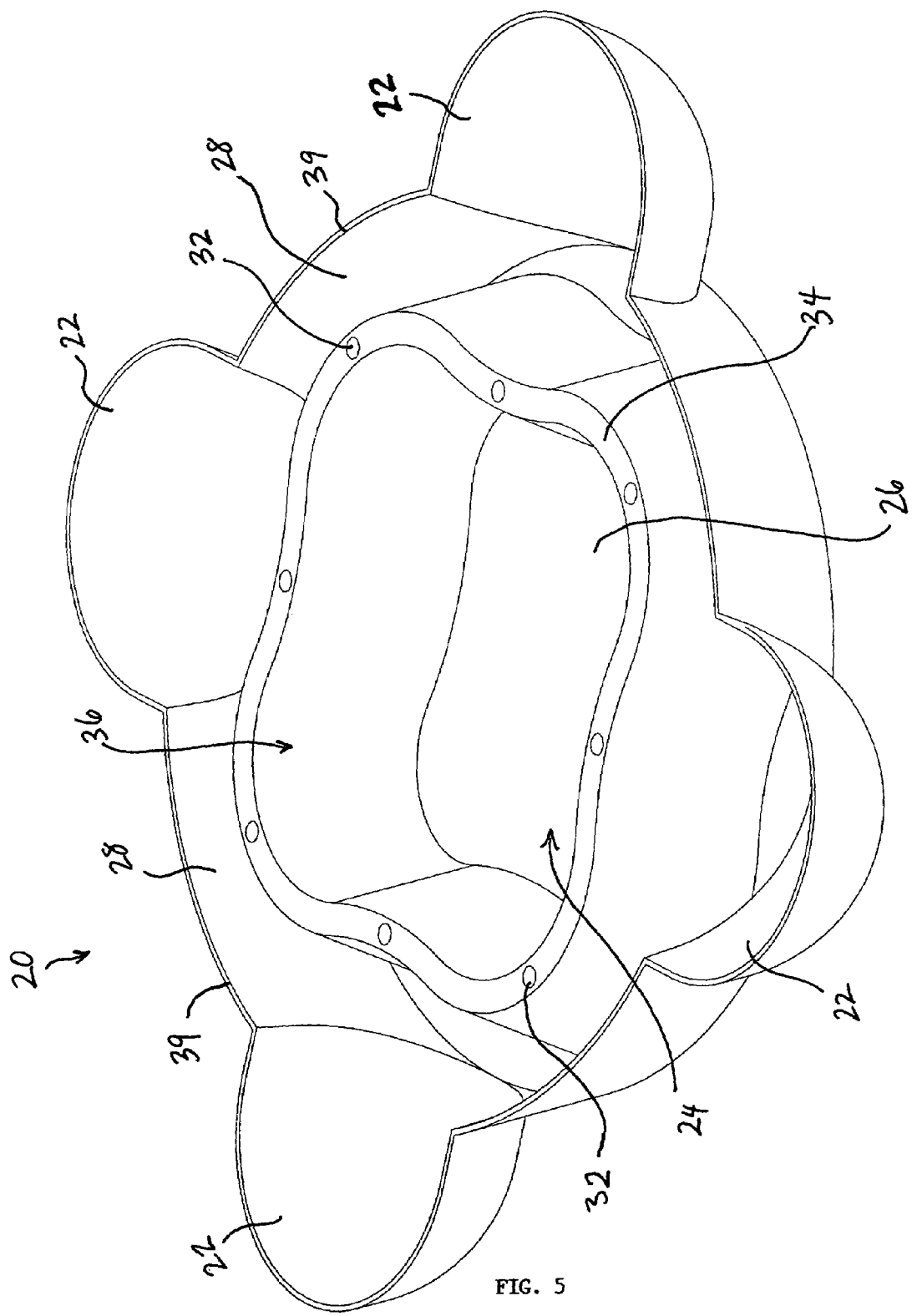
FIG. 5 is a top perspective view of one exemplary form of a planter tray that is used in the planter shown in FIG. 1 having rounded planter cups and a center portion with a bottom wall therein defining a recess in the center portion.
Figure 28:
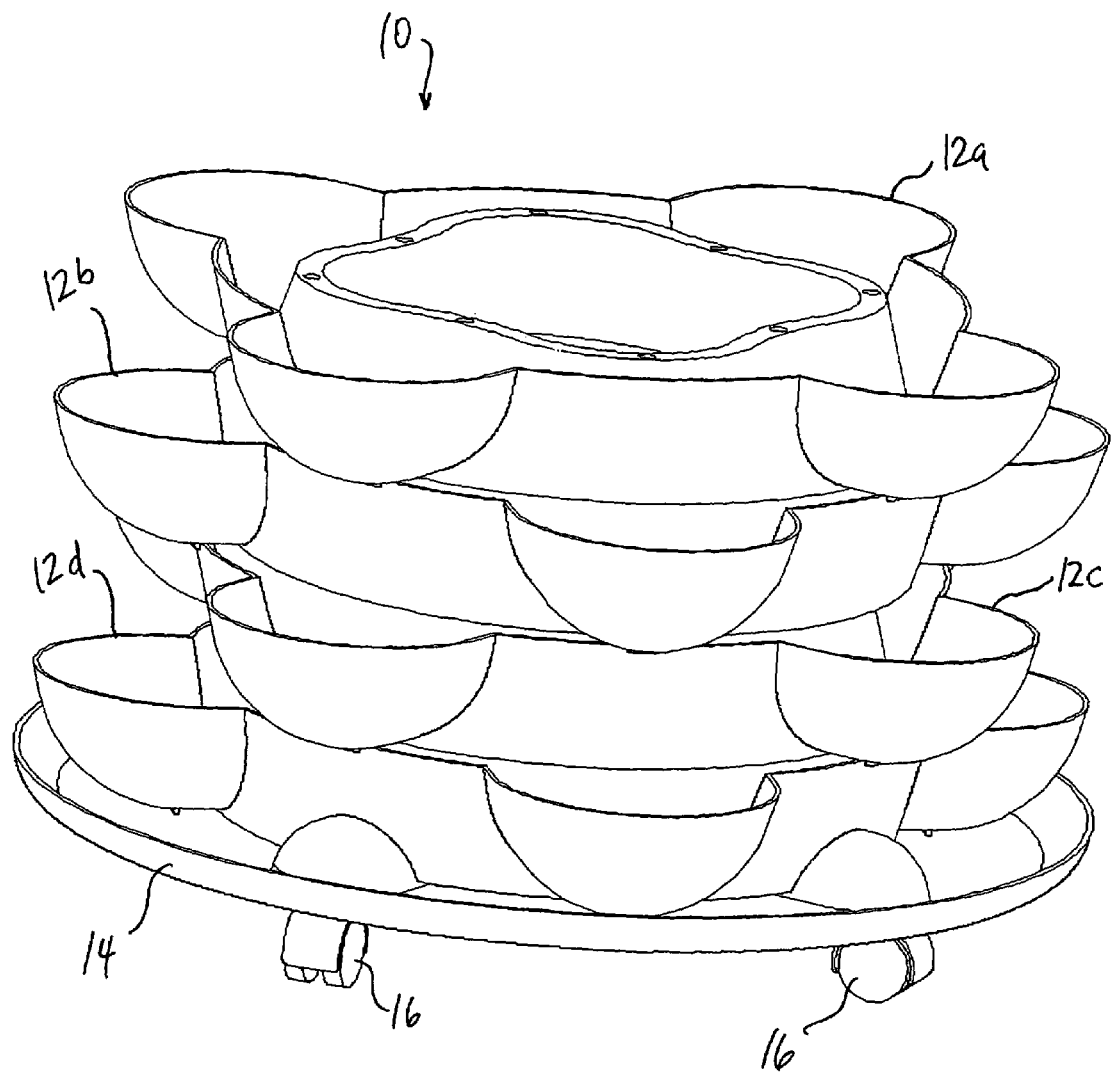
FIG. 28 is a top perspective view of the stackable planter with wheels as shown in FIGS. 2 and 3.
Figure 29:
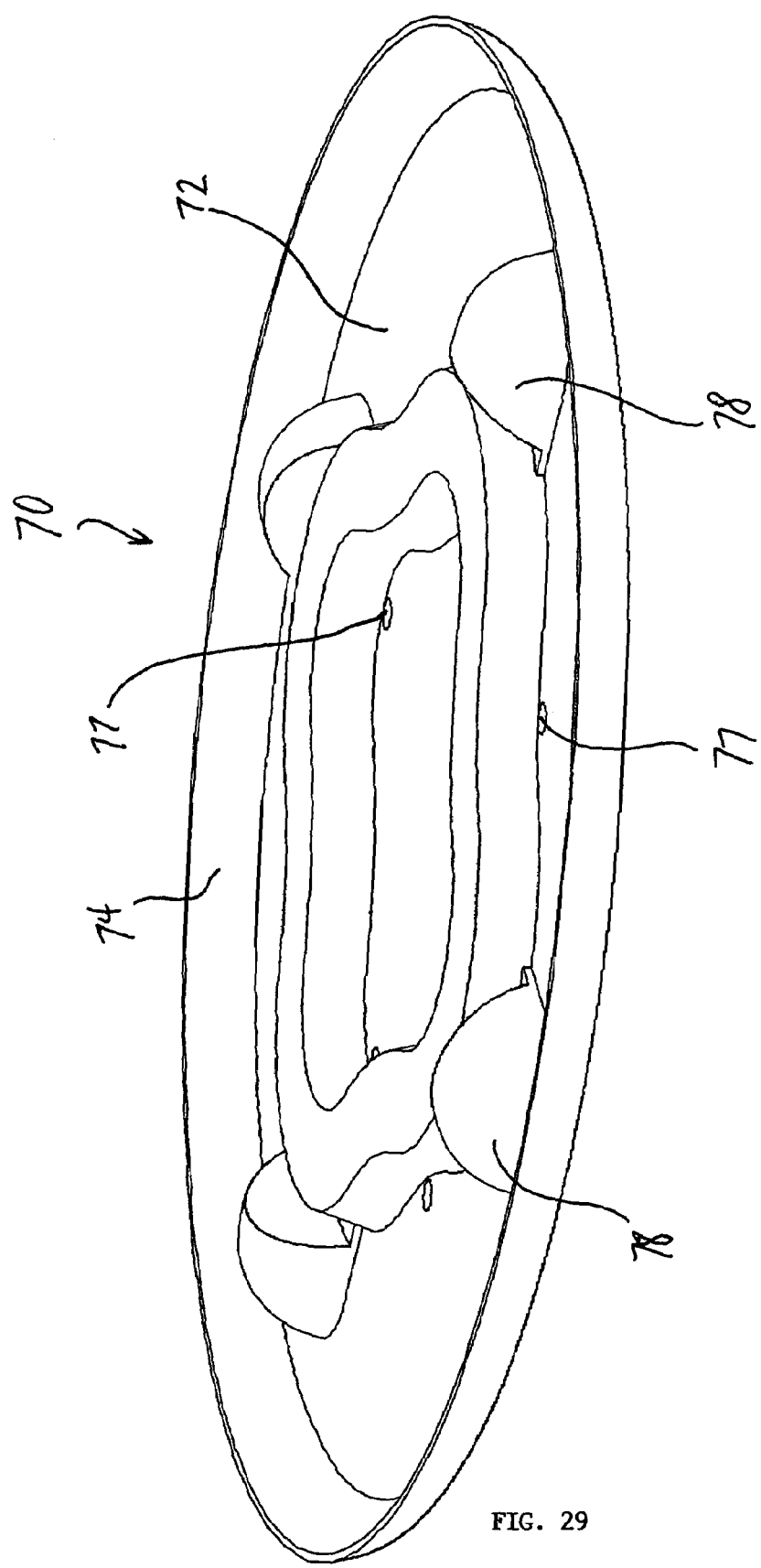
FIG. 29 is another upper perspective view of a cart as shown in FIG. 12.

FIGS. 1–4 and FIG. 28 illustrate one exemplary embodiment of a stackable planter constructed according to the present invention. In this embodiment, the stackable planter 10 is comprised of four trays, 12a, 12b, 12c, 12d, and a cart 14. In this particular embodiment, the cart 14 has wheels 16 fixed thereto, as shown in FIGS. 2, 3, and 28. The wheels 16, as illustrated, are shown as casters designed particularly to roll on hard surfaces, allowing the planter 10 to be rolled in and out of a house, garage, shed, or the like, e.g., during cold nights or bad weather.

While the illustrated embodiment 10 includes four trays 12 stacked on a cart 14, it should be understood that any number of planter trays 12 may be used in the system. Depending on some configurations of the planter trays 12, when using a wheeled cart as shown, the height of the stacked planter trays, and thus the number of trays in the system, may be limited to a determined amount. By providing a modular planter in this fashion, the planter trays 12 may be stacked to varying heights. A stackable planter comprising eight or more trays may hold up to or more than thirty-two plants, in a stacked configuration. A stackable planter of this type provides space for growing plants in a very compact footprint.

The cart 14 provides several advantages when it is used with the planter trays 12. For example, the cart 14 improves the portability of the stackable planter 10. It also helps prevent leaks or spills from the planter trays 12 from reaching a floor or patio surface. When used outdoors, the cart 14 may prevent weed growth around the planter 10. It may also provide an additional growth area for shallow rooted plants, such as a ground cover, when soil is added to the cart 14.

FIGS. 5–8 and FIG. 31 illustrate one exemplary form of a planter tray 20 that may be used in the planter 10 shown in FIG. 1. The planter tray 20 includes four rounded planter cups 22 and a center portion 24 having a bottom wall 26 therein defining a recess in the center portion 24. The cups 22 are shaped to hold sufficient soil to support a plant planted therein. In a preferred embodiment of a planter tray 20, an open channel 28 connects the cups 22 around the periphery of the planter tray 20. The channel 28 is preferably filled with soil and allows root growth and moisture to move between the planter cups 22. In this manner, the entire outer ring of the planter tray 20, including the cups 22 and the open channels 28, may be filled with soil, plants, and roots.

Figure 6:
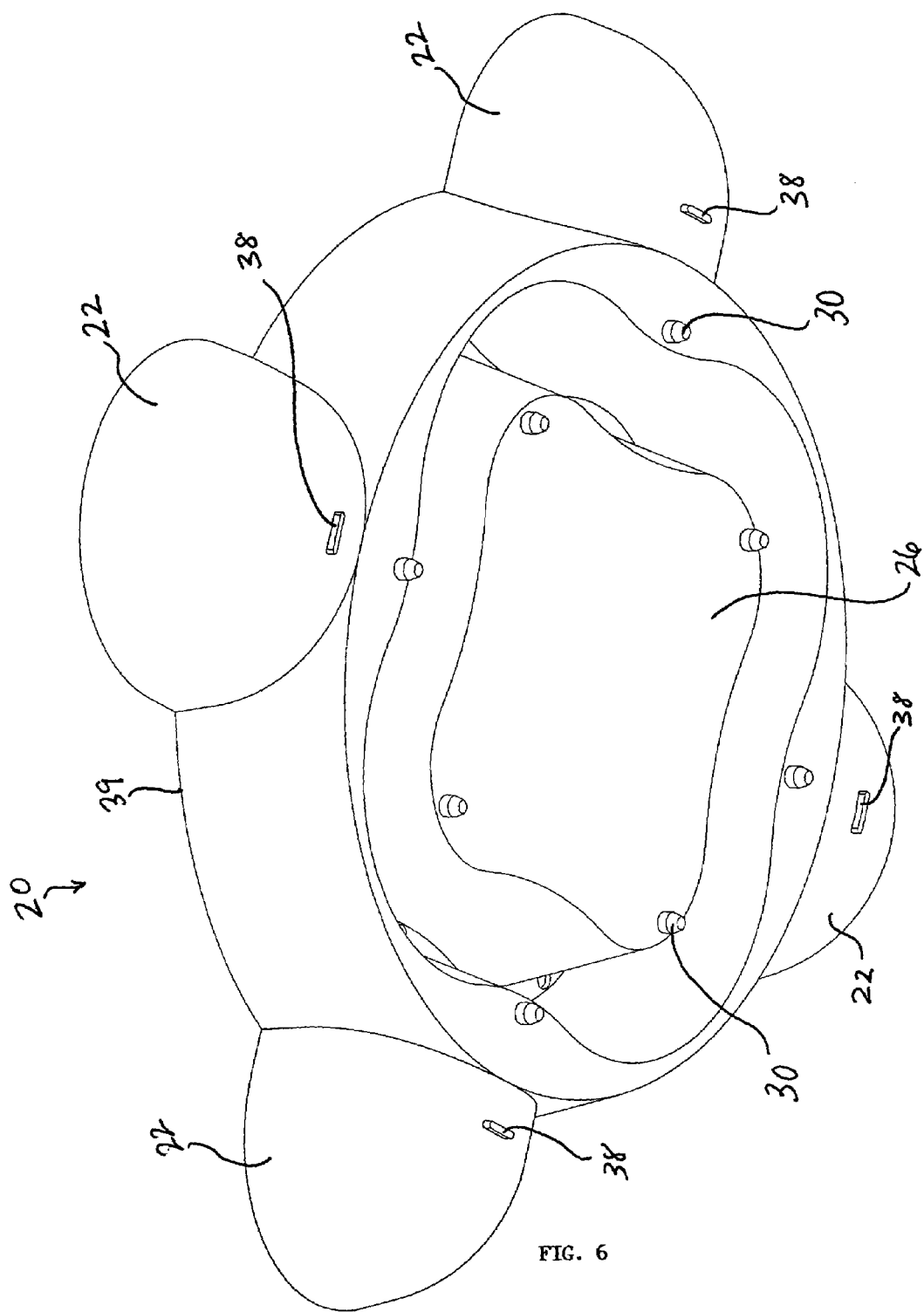
FIG. 6 is a bottom perspective view of the tray shown in FIG. 5.
Figure 7:
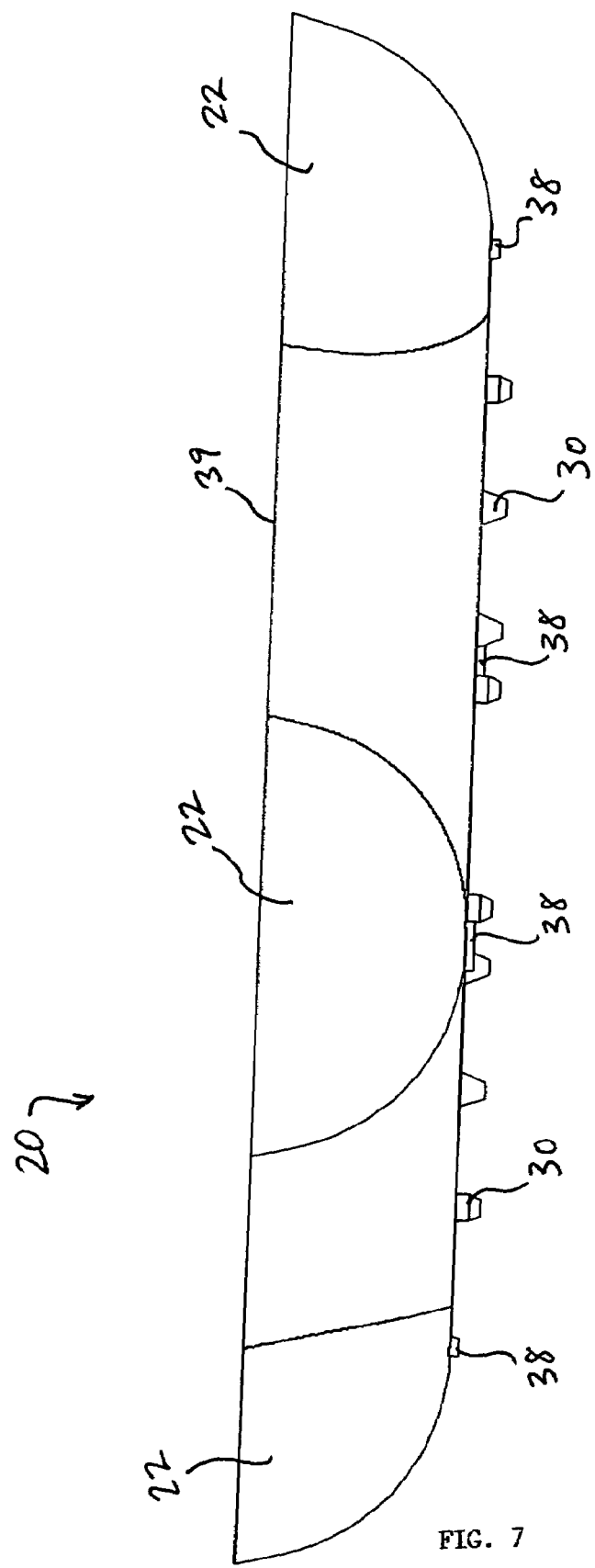
FIG. 7 is a side elevation view of the tray shown in FIG. 5.
Figure 8:
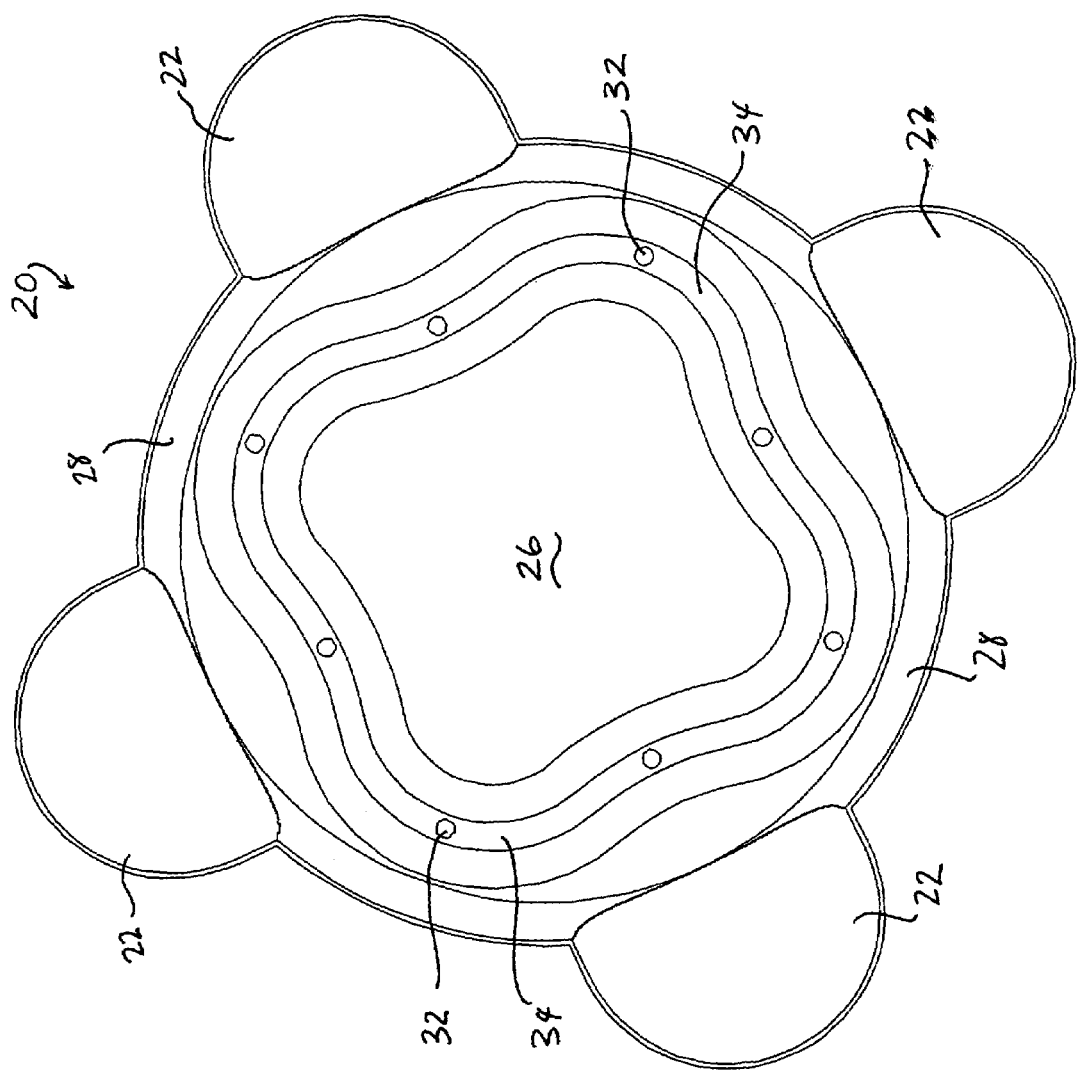
FIG. 8 is a top plan view of the tray shown in FIG. 5.
Figure 25:
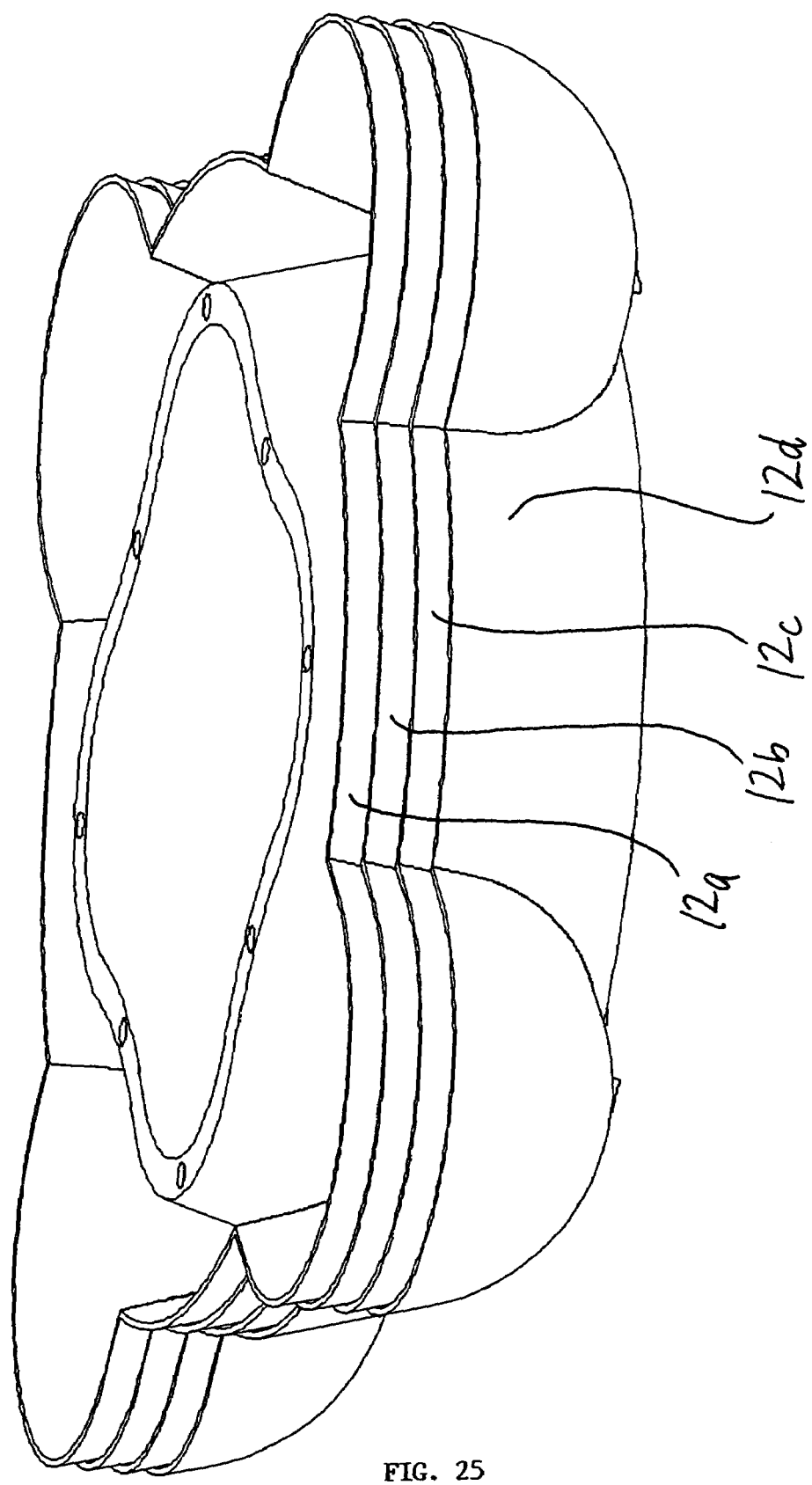
FIG. 25 is a top perspective view of the four trays of the stackable planter shown in FIG. 1 in a collapsed configuration.
Figure 26:
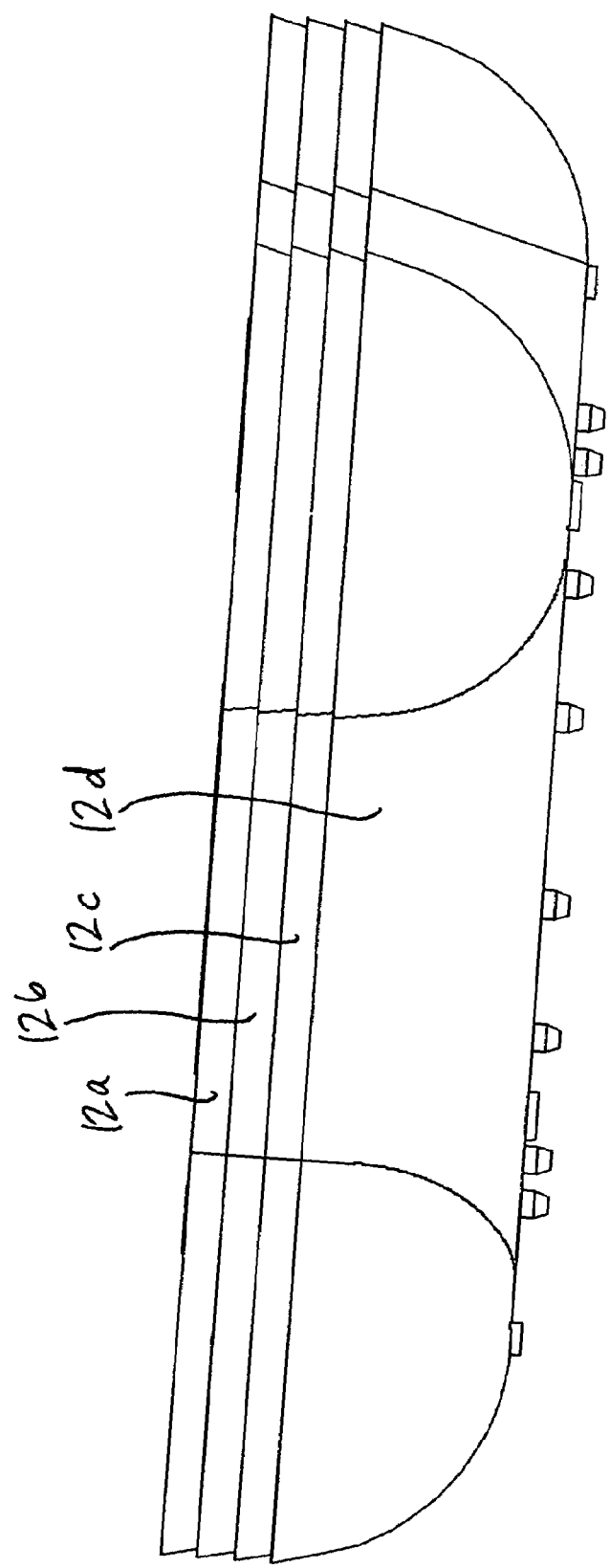
FIG. 26 is a side elevation view of the collapsed planter trays shown in FIG. 25.

FIGS. 6 and 7 illustrate pegs or pins 30 projecting from the bottom of the planter tray 20. The pins 30 are located and sized to mate with and extend through holes 32 (shown in FIGS. 5 and 8) defined on the upper surface 34 of an inner rib 36 of the tray 20. The inner rib 36 provides vertical strength when the planter trays 20 of the stackable planter are assembled in a stacked configuration. The inner rib 36 also facilitates nesting of the trays when the trays are in a collapsed configuration, as shown in FIGS. 25 and 26. Each tray 20 is thus capable of supporting another tray stacked on top of it. The trays 20 remain aligned when in a stacked configuration by way of the pins 30 extending into and locking with holes 32 in the adjacent tray below it. As can be observed from FIGS. 5 and 6, the pins 30 and holes 32 are located in a manner such that the planter cups of adjacent trays are rotated and offset from each other when stacked allowing plants in the planter cups 22 of each tray to receive light and moisture.

The planter trays 20 may further include tabs 38 protruding from the bottom of the tray 20, to align with the outer periphery 39 of the adjacent tray below it. In this manner, each tray 20 supports the perimeter 39 of the adjacent tray below it to prevent the sagging or expansion of the lower trays when the trays are filled with soil and stacked. This is particularly beneficial when using a softer plastic to manufacture the trays 20. Softer plastics often tend to better withstand blows or strikes, cold weather, and/or incorporate UV inhibitors to resist discoloring.

As noted earlier, the tray 20 includes a bottom wall 26 in the center portion of the tray 20. The bottom wall 26 in combination with the inner rib 36 defines a recess in the center portion for holding an additional plant or plants. Depending on the number of trays that are stacked, and the location of the tray 20 having a bottom wall 26 in the stack, a large plant can be planted in the center portion of the stackable planter.

Figure 9:
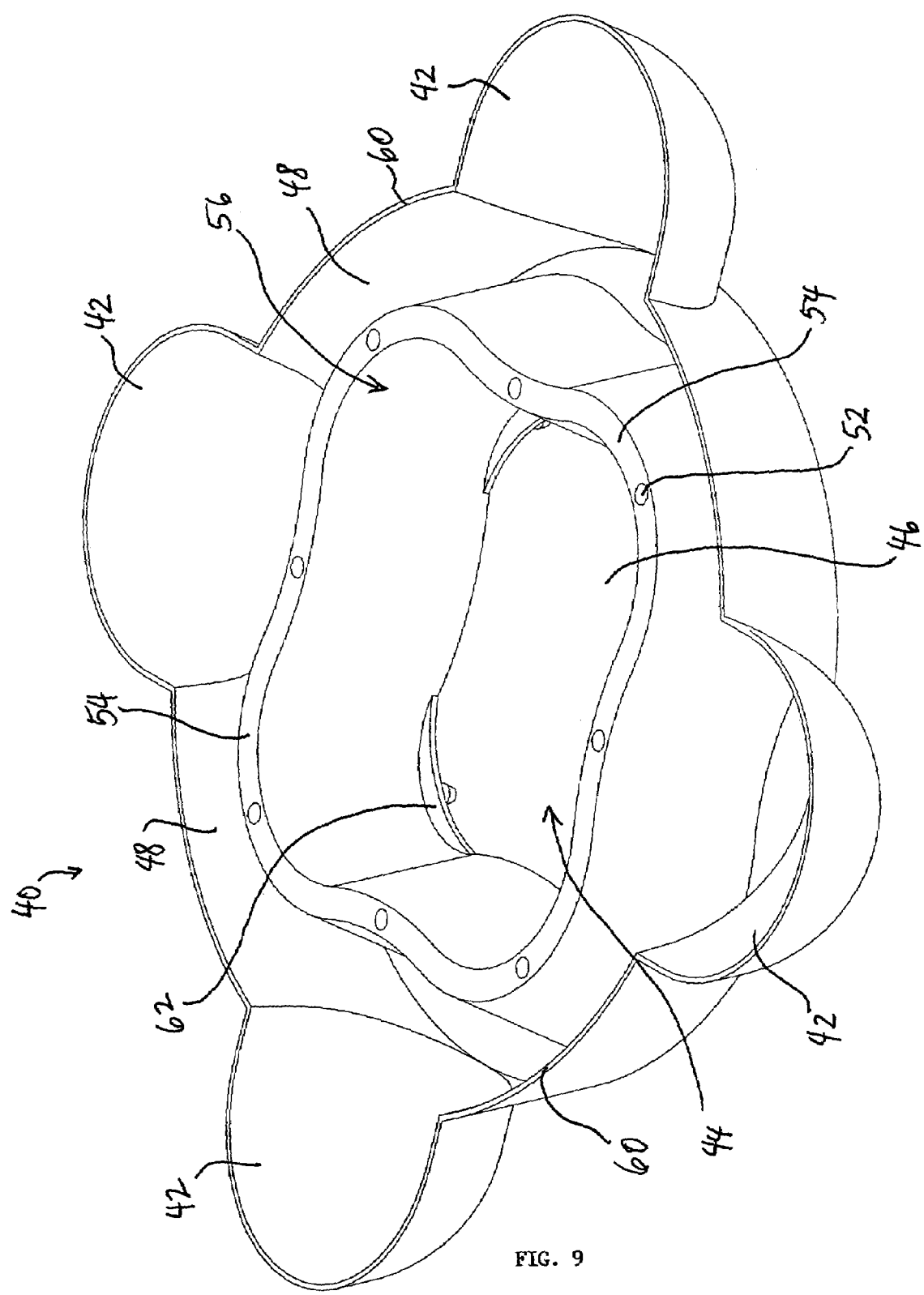
FIG. 9 is a top perspective view of one exemplary form of a planter tray that is used in the planter shown in FIG. 1 having a center portion without a bottom wall therein, thereby defining an open aperture in the center portion.
Figure 10:
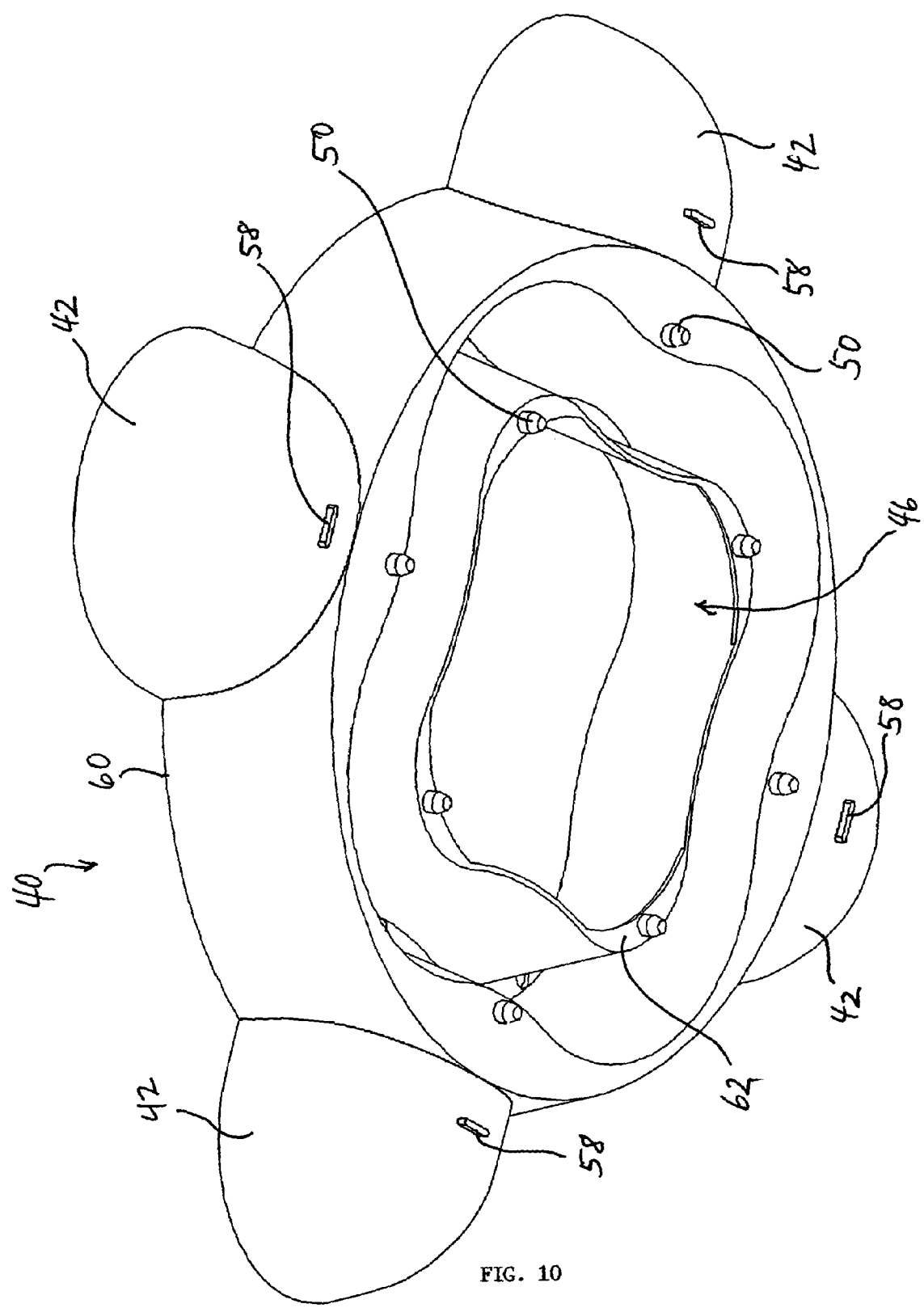
FIG. 10 is a bottom perspective view of the tray shown in FIG. 9.
Figure 11:
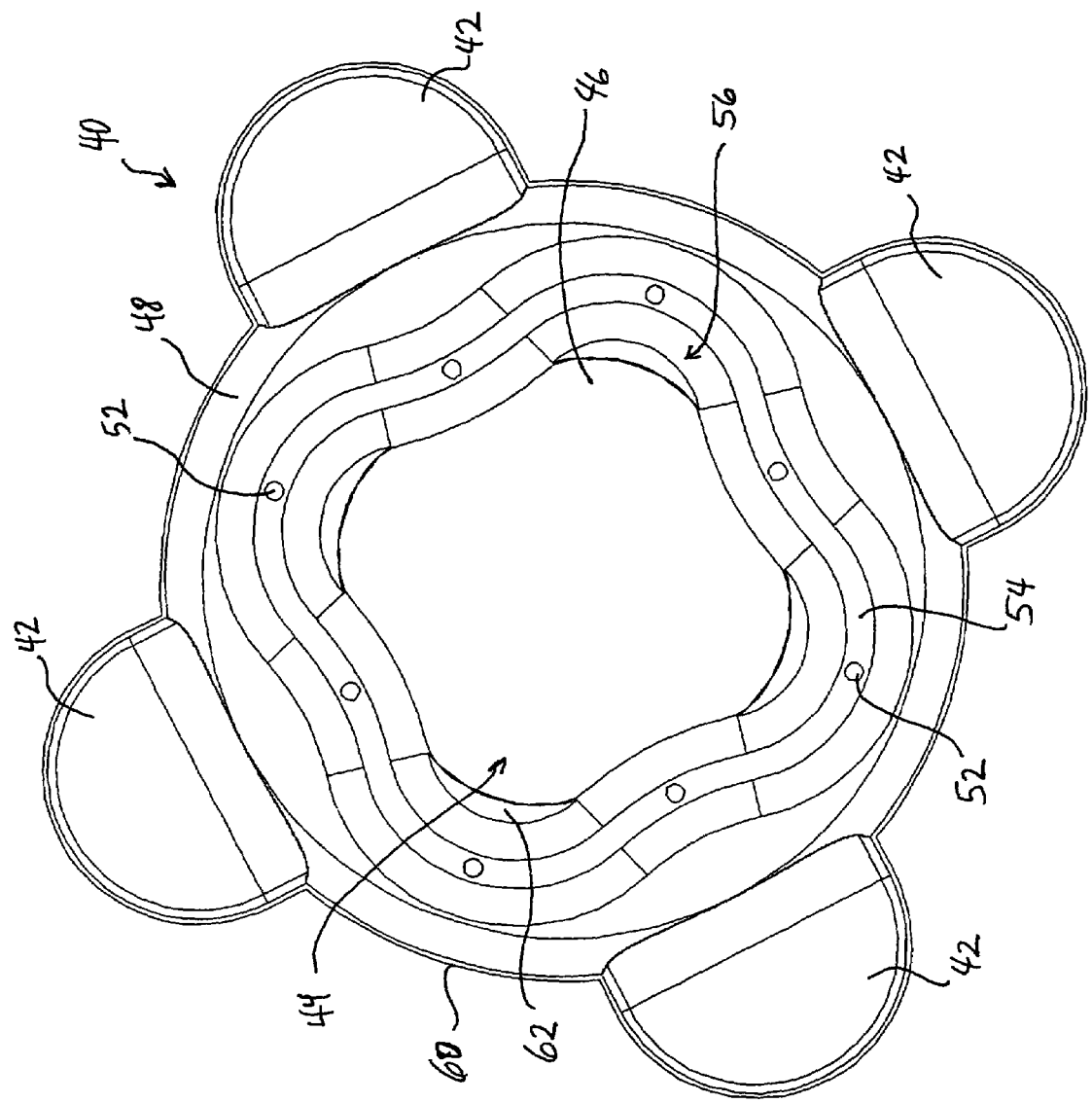
FIG. 11 is a top plan view of the tray shown in FIG. 9.
Figure 12:
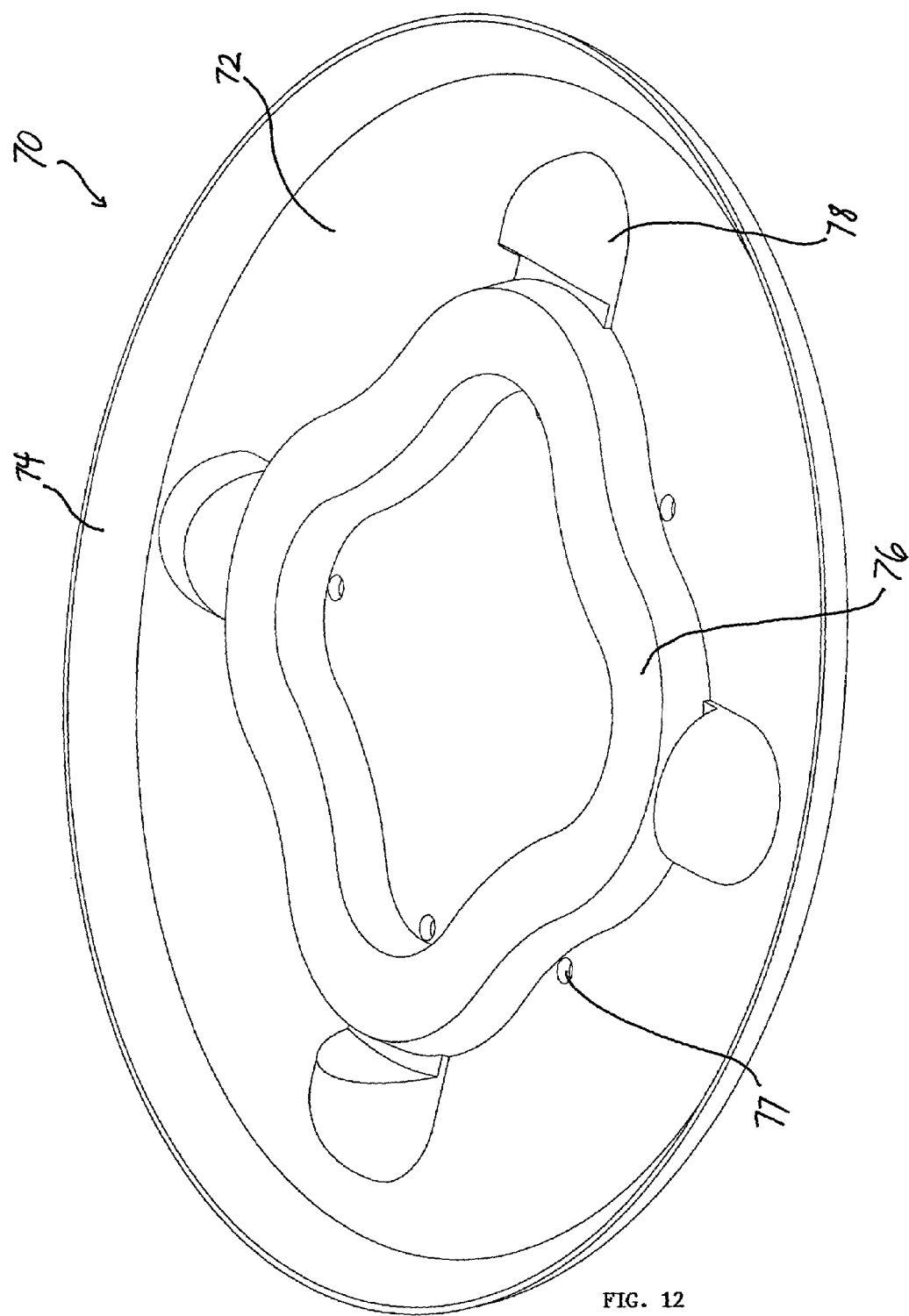
FIG. 12 is a top perspective view of one exemplary form of a cart that is used in the planter shown in FIG. 1.

FIGS. 9–11 illustrate one exemplary form of a planter tray 40 that can be used in the planter shown in FIG. 1. The planter tray 40, in contrast to the planter tray 20, has a center portion 44 without a bottom wall therein, thereby defining an open aperture 46 in the center portion.

Similar to the planter tray 20, the planter tray 40 includes a plurality of planter cups 42 and open channels 48 between the planter cups 42 for holding soil and plants. Furthermore, the planter tray 40 includes pins 50 that protrude from the bottom of the planter tray. The pins 50 mate with and extend through holes 52 defined in a top surface 54 of an inner rib 56 of the planter tray 40. Preferably, the planter trays 40 are interchangeable with planter trays 20 in a stackable planter. Accordingly, the pins 50 and holes 52 are located in similar locations as the pins 30 and holes 32 in the planter tray 20. Likewise, the planter tray 40 includes tabs 58 that mate with an outer circumference 60 of the tray 40, much like the tabs 38 that meet with and engage the outer circumference 39 of the planter tray 20. Ridges 62, as shown in FIGS. 9–11, may be used to support the wall of the inner rib 56. Ridges 62 also support some of the pins 50, as best seen in FIG. 10.

FIGS. 12–15 and FIG. 29 illustrate one exemplary form of a cart 70 that may be used in a stackable planter in accordance with the present invention. The cart 70 includes a bottom surface 72 and a vertical or sloped outer ring 74 having a diameter that preferably extends beyond the outer circumference of the trays 20 and 40 as previously described. When the stackable planter is assembled in a stacked configuration, either a planter tray 20 or 40 is placed on the cart 70 such that the inner rib of the tray 20, 40 fits on top of an inner rib 76 of the cart 70, as guided by the guides 78. Pins extending from the bottom of the tray 20, 40 may extend into recesses 77 defined in the bottom surface 72 of the tray 70.

Figure 13:
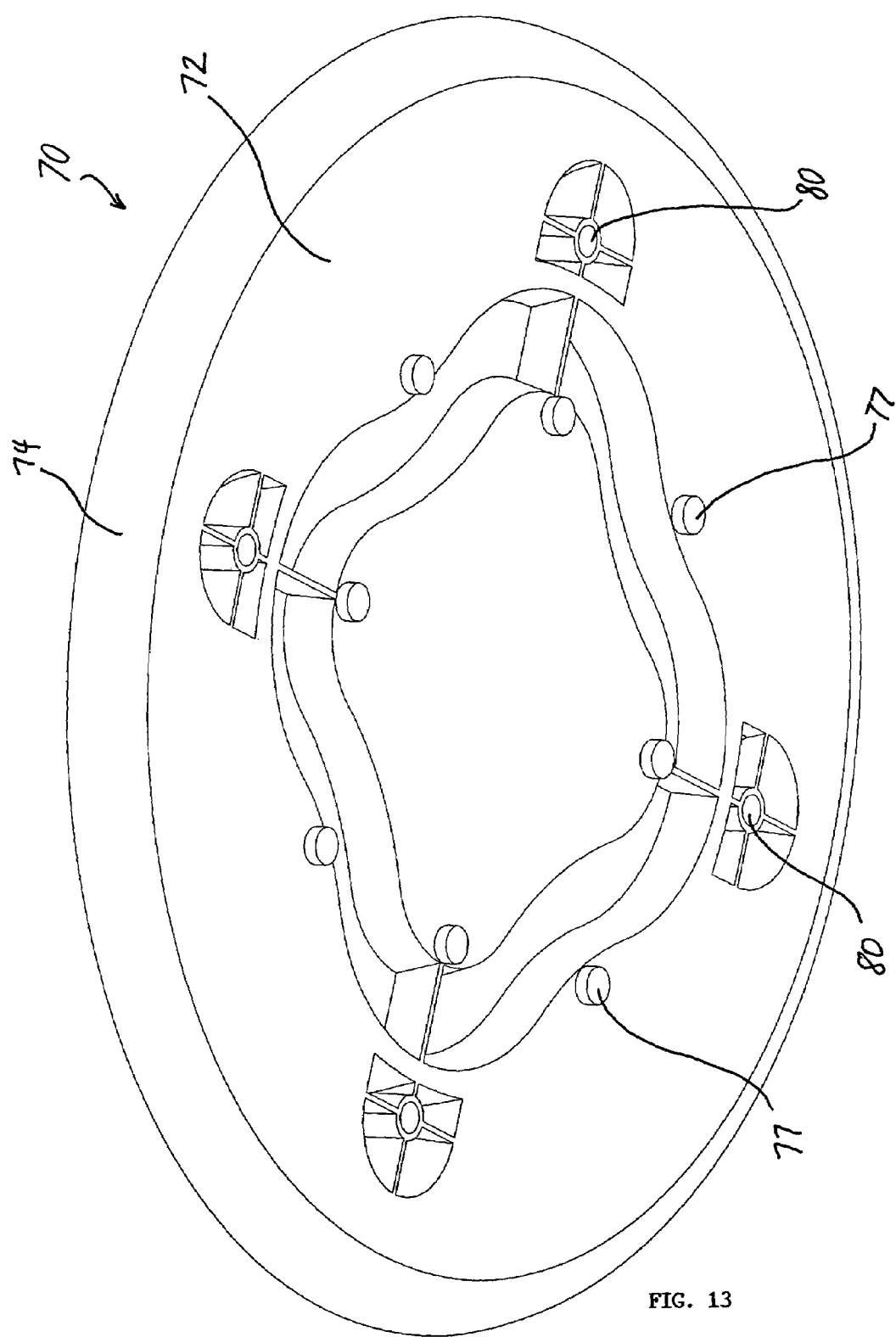
FIG. 13 is a bottom perspective view of the cart shown in FIG. 12.
Figure 14:
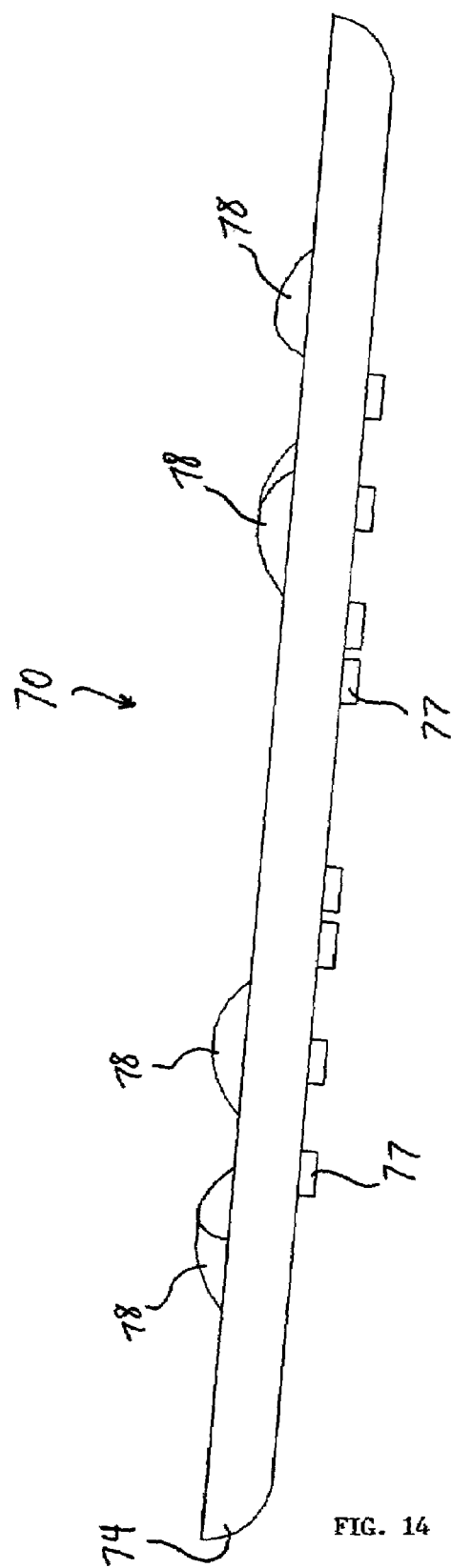
FIG. 14 is a side elevation view of the cart shown in FIG. 12.
Figure 15:
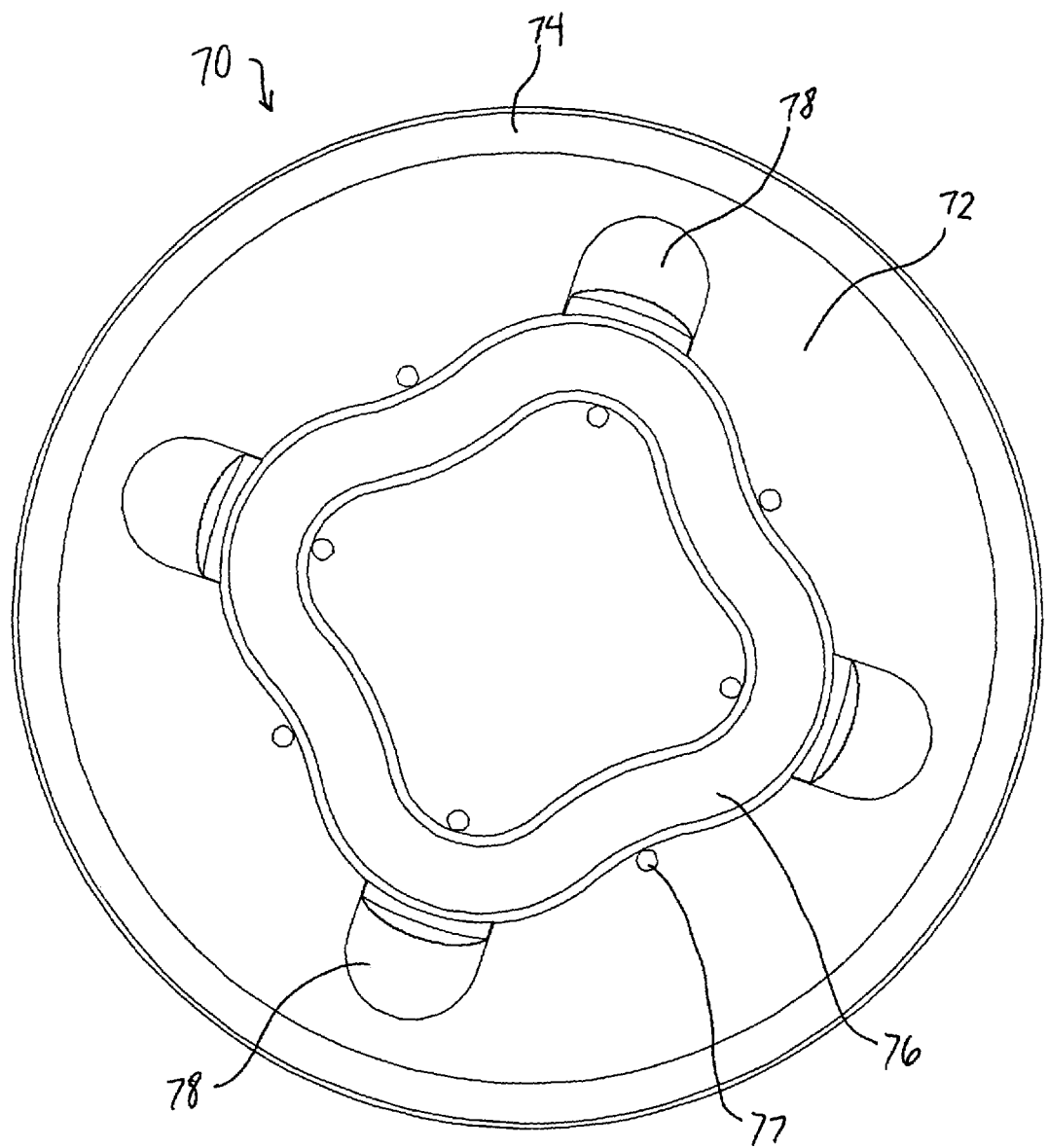
FIG. 15 is a top view plan of the cart shown in FIG. 12.

The cart 70 may lay flat on the floor or ground. Alternatively, the cart 70 may be fitted with wheels, as previously described, or stakes, as will be described below. In FIG. 13, recesses 80 extend upward in the space afforded by the guides 78 for receiving an upper post or end of a wheel or stake, as desired. While the cart 70 helps prevent leaks or spills from the planter trays from reaching a floor or patio surface, it may also provide an additional growth area for shallow rooted plants, such as a ground cover, when soil is placed on the bottom surface 72 within the outer ring 74.

Figure 16:
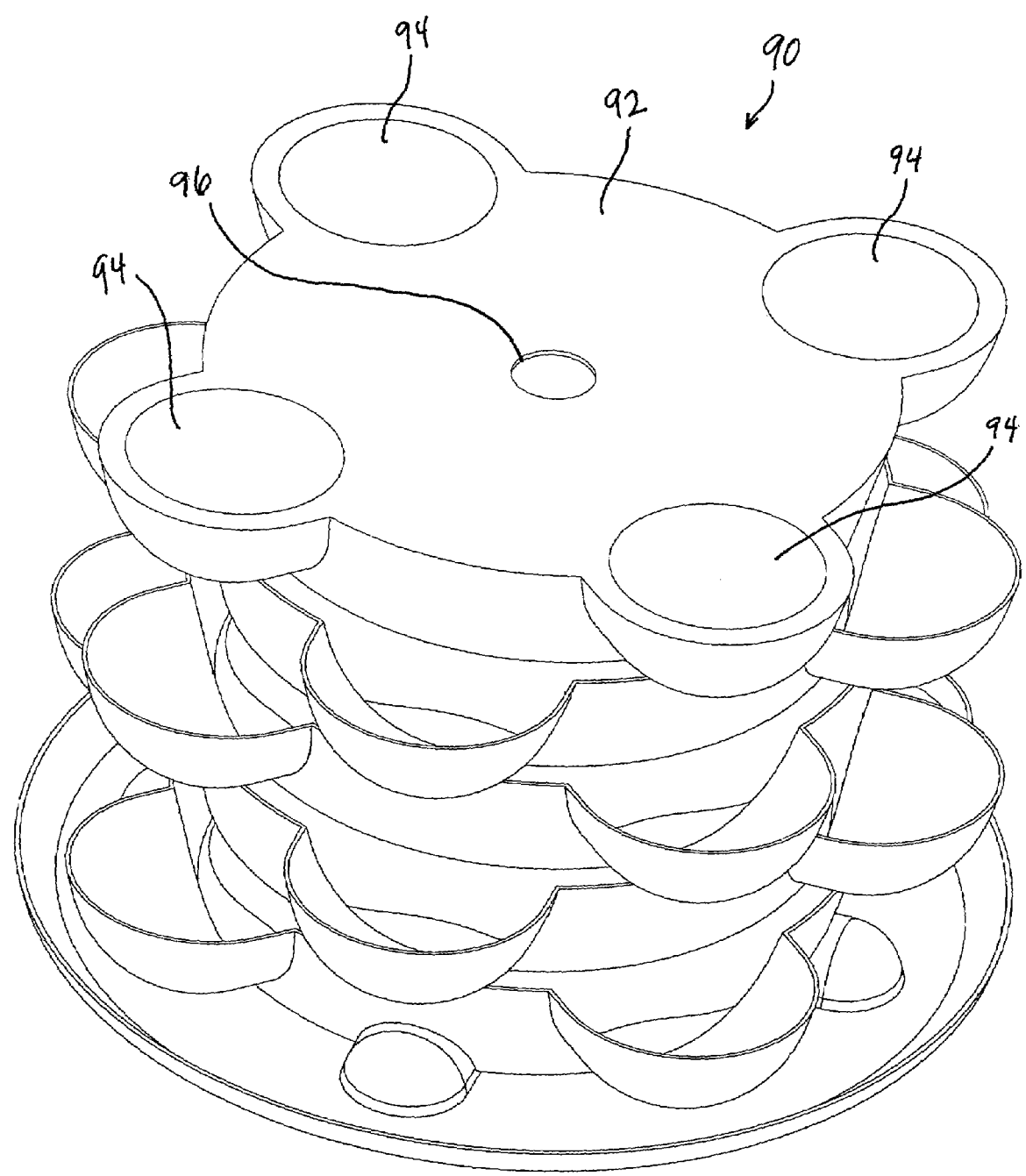
FIG. 16 is a top perspective view of another embodiment of a stackable planter as shown in FIG. 1 with a watering tank placed on top thereof.
Figure 17:
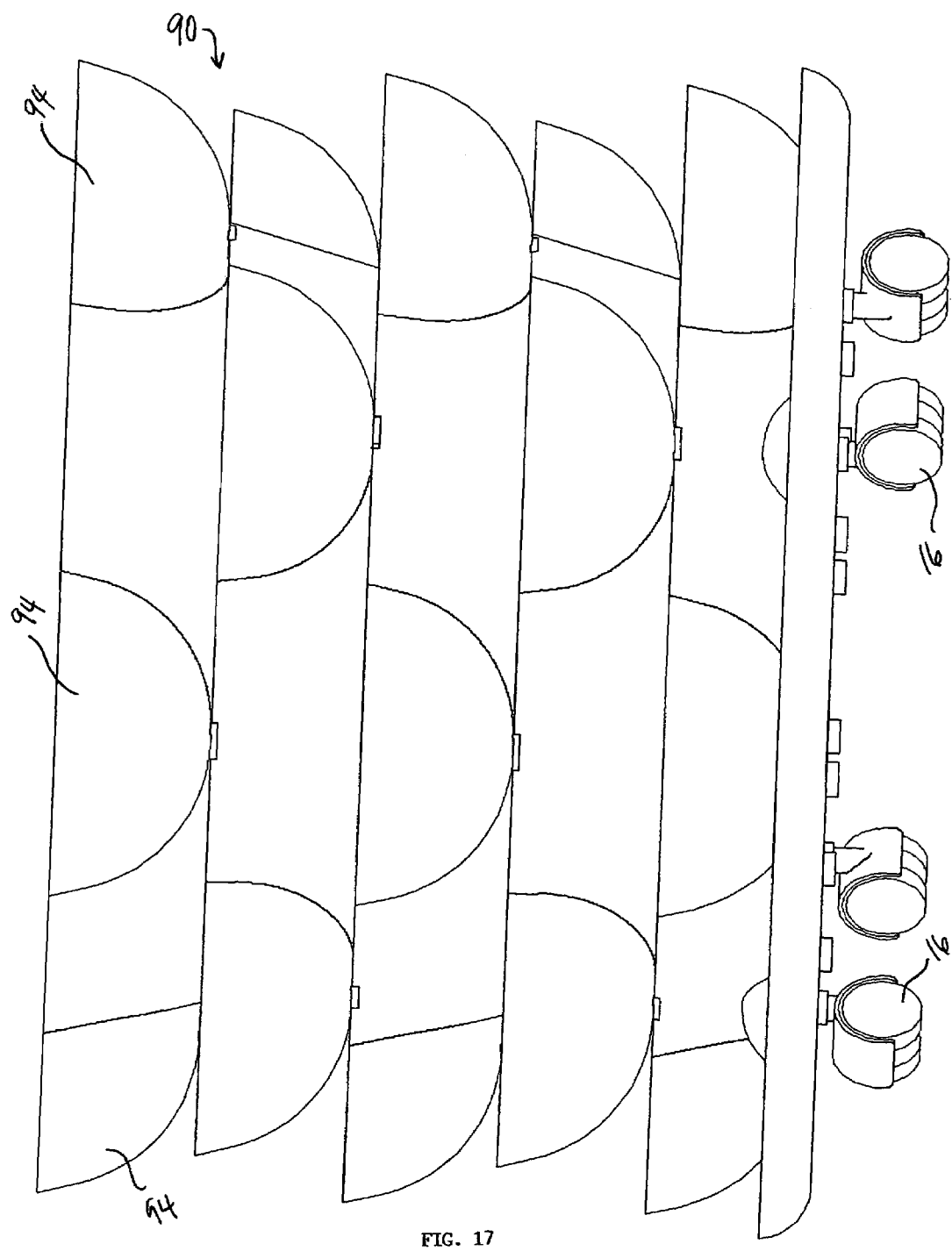
FIG. 17 is a side elevation view of the planter with watering tank shown in FIG. 16 and further with wheels attached to the cart.
Figure 18:
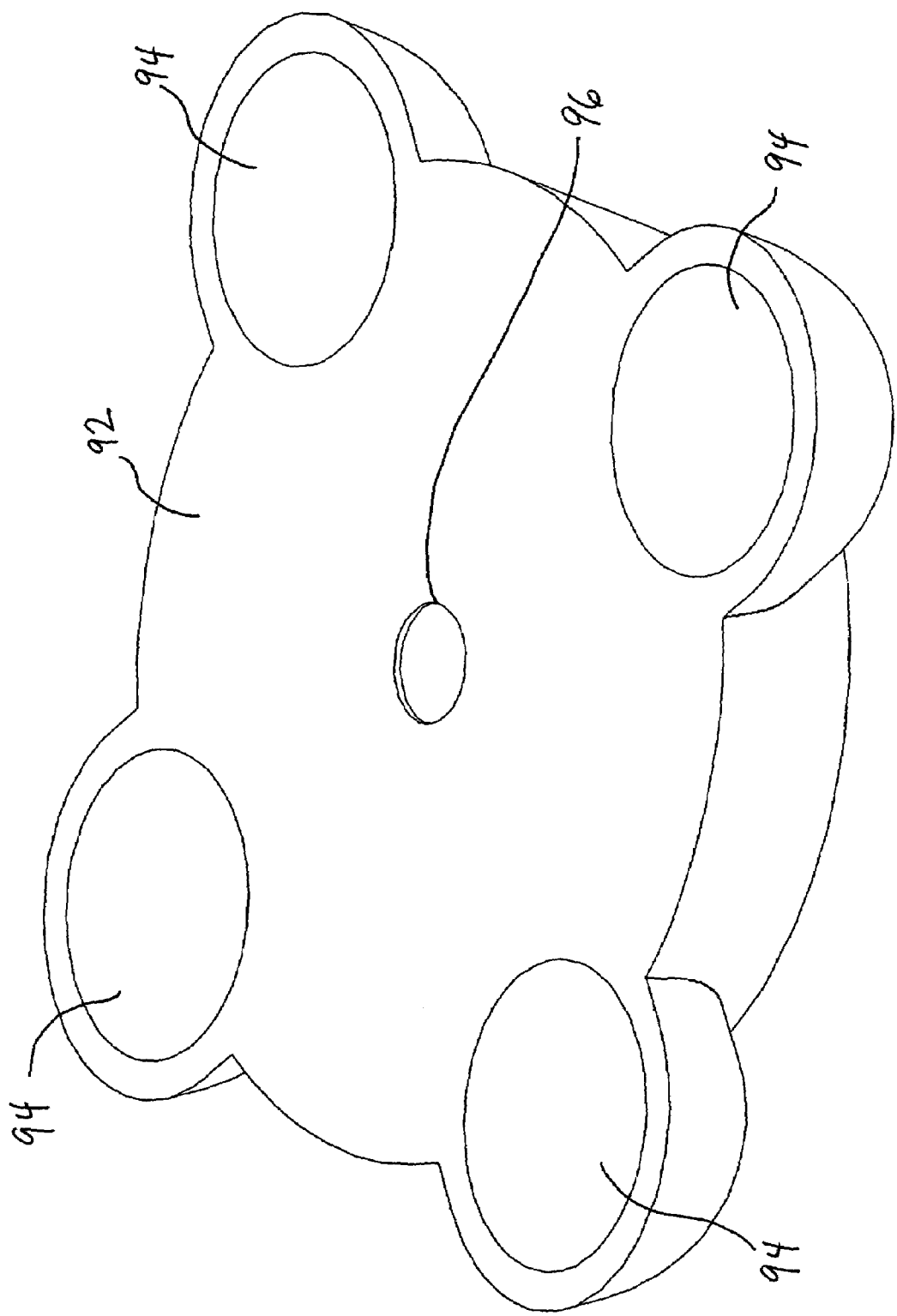
FIG. 18 is a top perspective view of the watering tank shown in FIG. 16.
Figure 19:
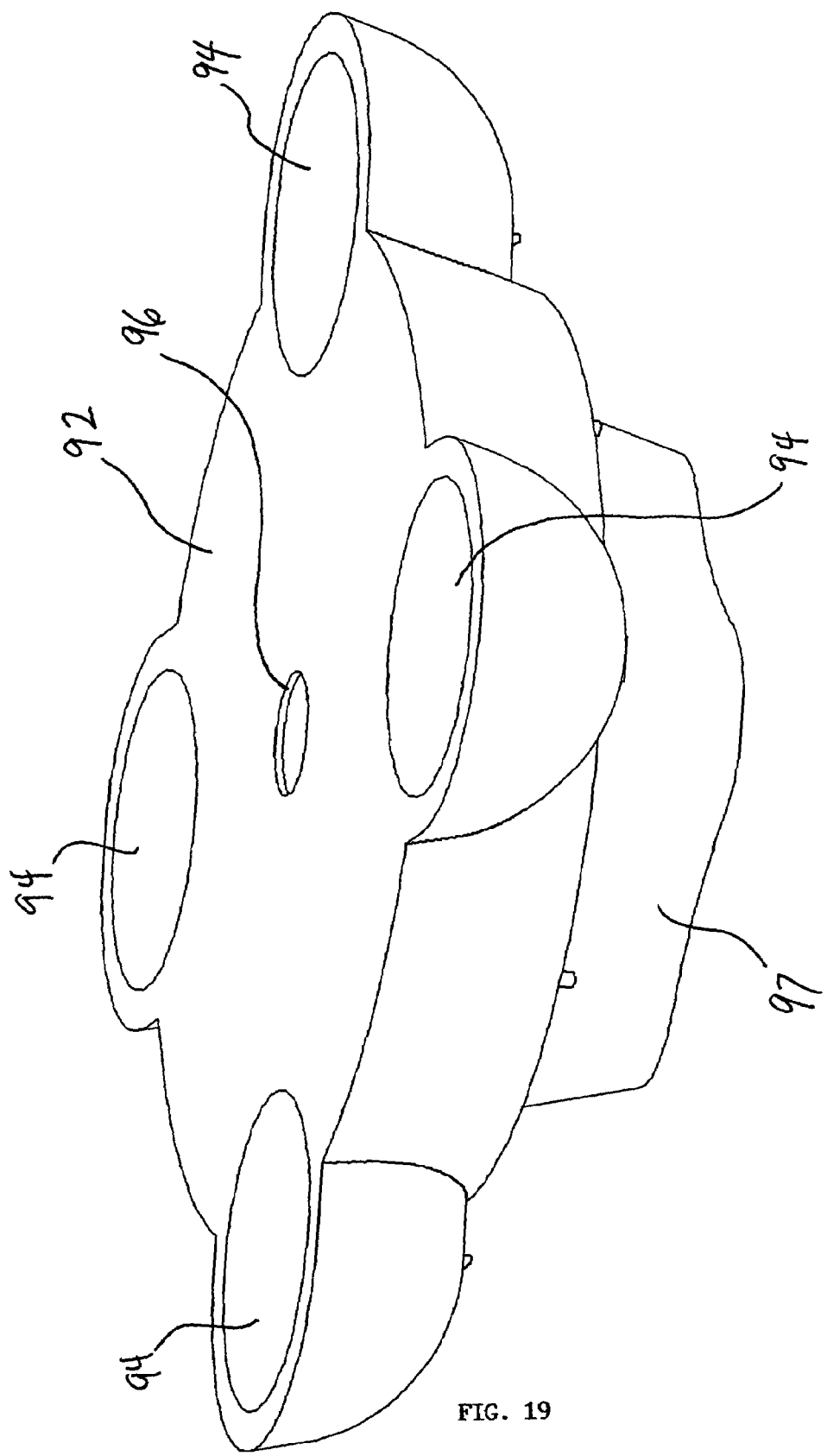
FIG. 19 is an upper perspective view of the watering tank shown in FIG. 18.
Figure 20:
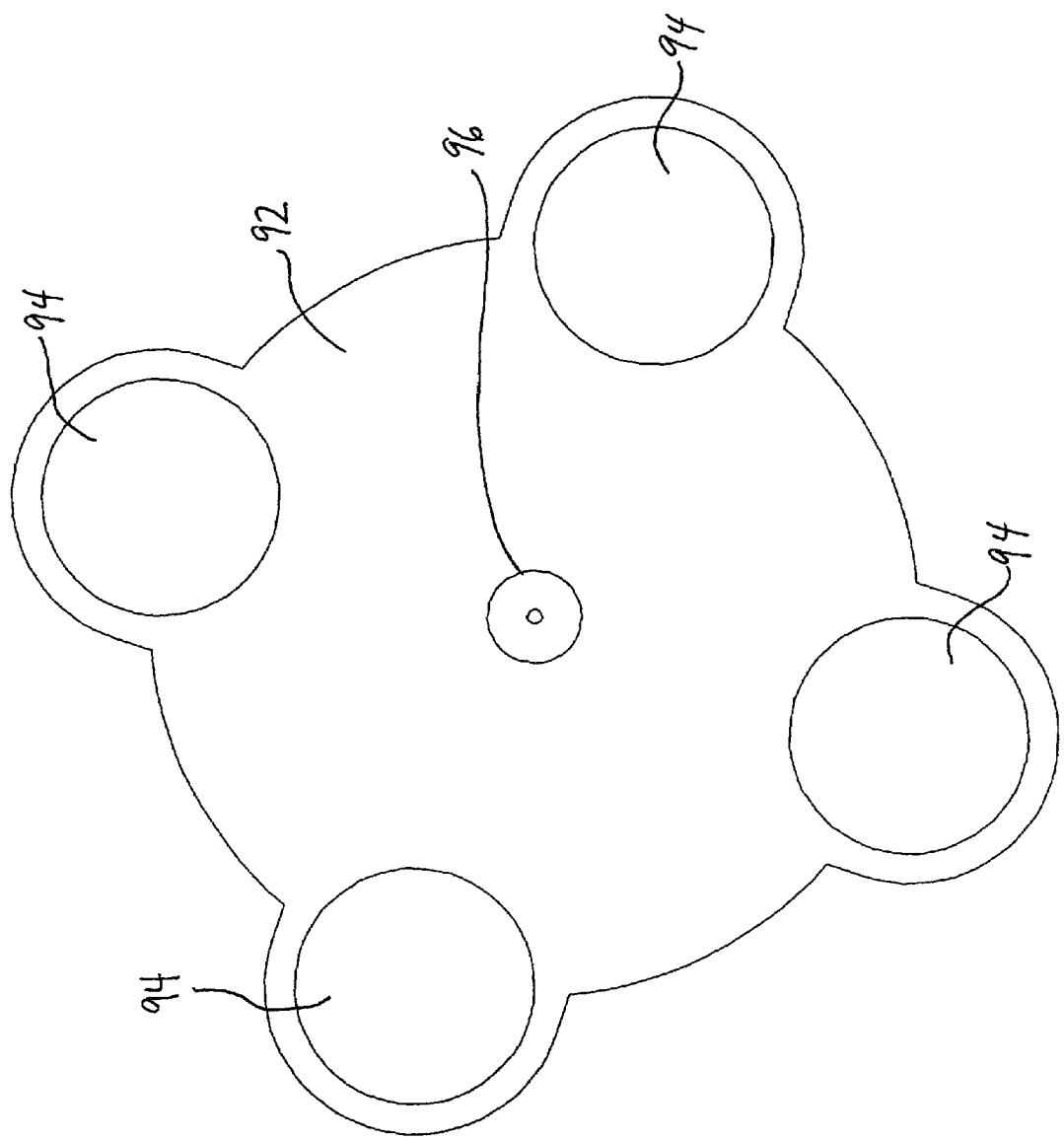
FIG. 20 is a top plan view of the watering tank shown in FIG. 18.
Figure 27:
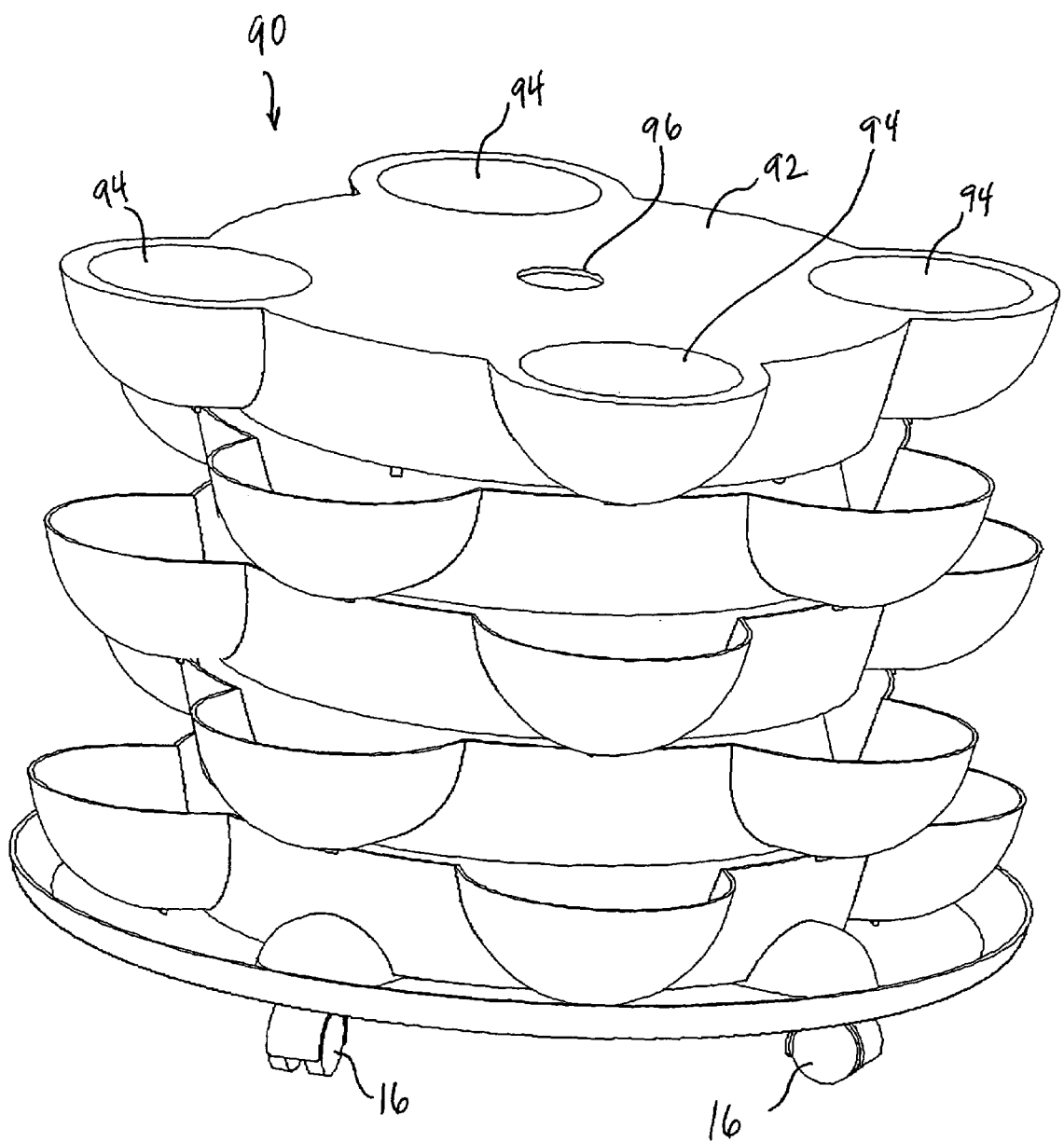
FIG. 27 is another upper perspective view of the planter with watering tank shown in FIG. 16 with wheels attached to the cart.

FIGS. 16–17, 27, and 32–33 depict another exemplary embodiment of a stackable planter 90 with a watering tank 92 placed on top thereof. FIGS. 18–20 depict additional views of the watering tank 92. In a preferred embodiment, though not required, the watering tank 92 may include additional planter cups 94. The planter cups 94, in this embodiment, are located along the periphery of the watering tank 92 and are offset from the planter cups of the planter trays 20, 40 that are stacked below the watering tank, as shown in FIG. 16. The embodiment of the stackable planter 90, as shown in FIGS. 17 and 27, includes wheels 16 attached to a cart 70, as previously described.

Figure 32:
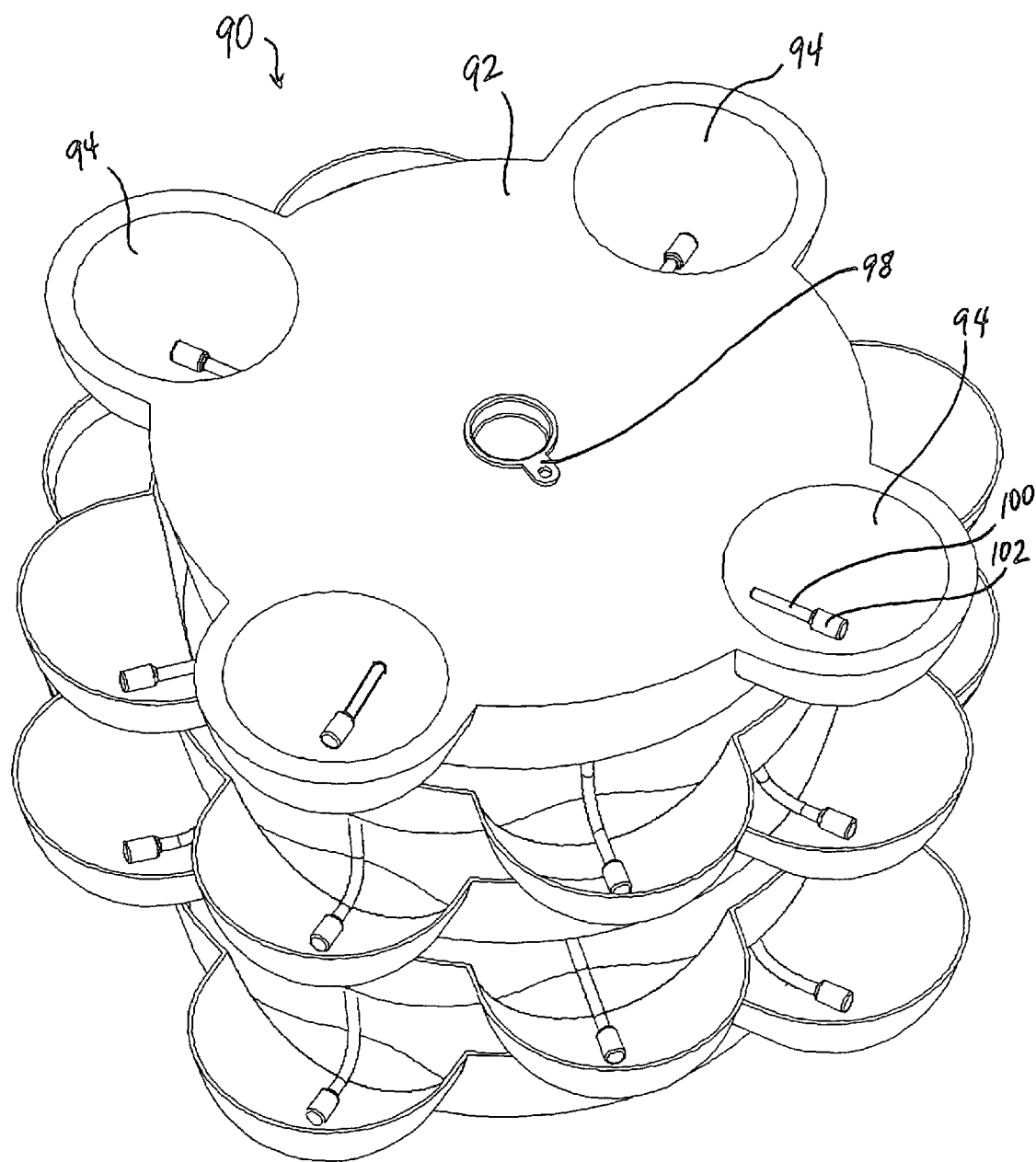
FIG. 32 is a top perspective view of a stackable planter with watering tank as shown in FIG. 16 and further showing watering leads from the watering tank that extend into the planter cups around the periphery of the planter trays and watering tank.
Figure 33:
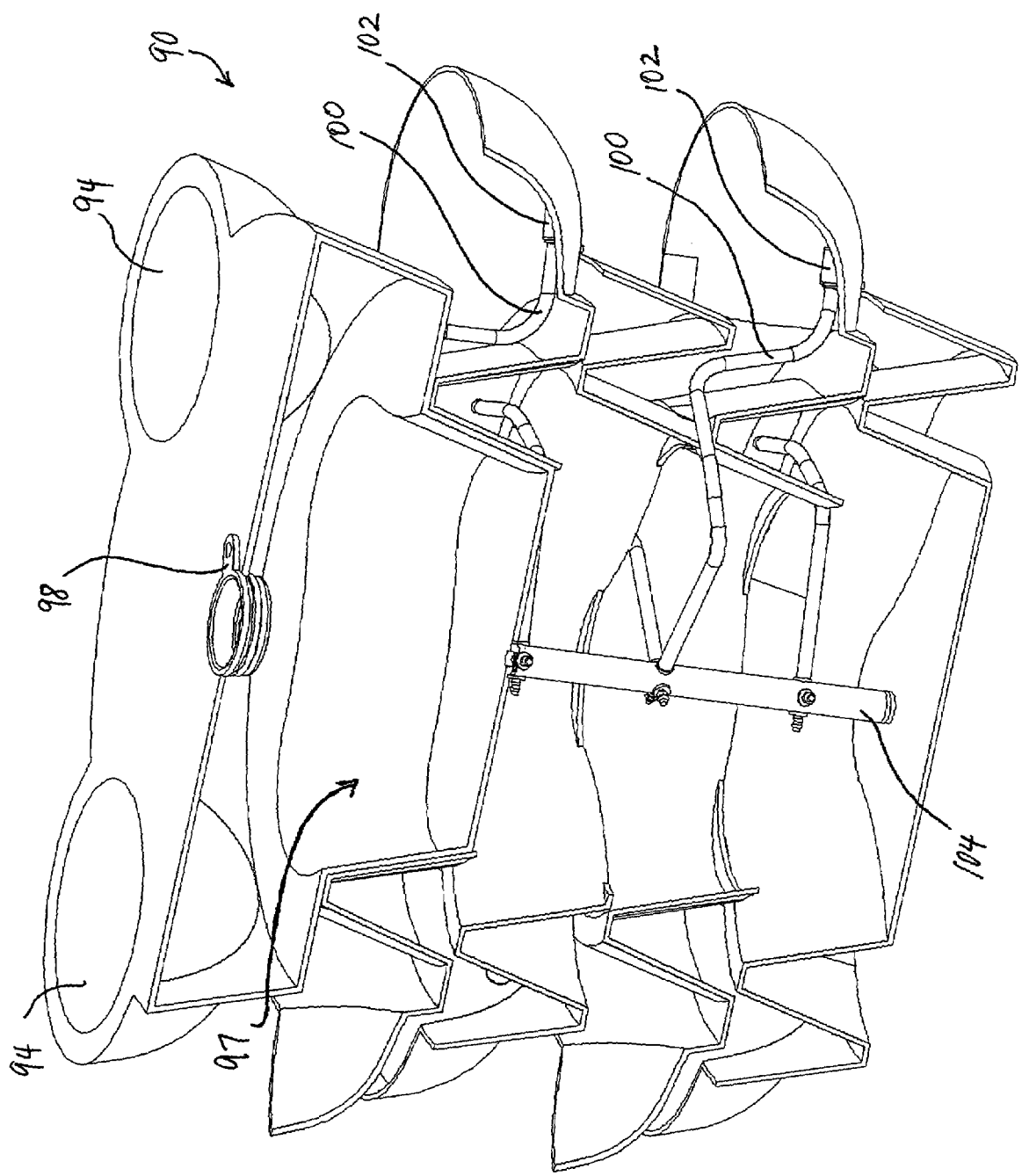
FIG. 33 is a cross-section perspective view of the planter and watering tank shown in FIG. 32, further illustrating the connection of watering leads from the watering tank to the planter cups.

The watering tank 92 includes an opening 96 on its upper surface for receiving water and nutrients that are to be distributed to the plants in the planter cups 94 and planter cups 22, 42, of the planter trays 20, 40 that are stacked below it. If desired, the opening 96 may be plugged with a plug in the shape of a measuring cup 98, as shown in FIGS. 32 and 33. The measuring cup 98 may be useful for measuring nutrients to be added to the water in the watering tank 92. The watering tank 92 may be further configured with a cavity 97 in the bottom thereof for holding an additional supply of water. The cavity 97 may be sized to extend downward through the central portion of one or more of the planter trays 40 stacked below the watering tank 92, as shown in FIG. 33.

In one particular embodiment, water is distributed from the watering tank 92 to the planter cups by way of watering tubes or drip lines 100 that, as shown in FIGS. 32 and 33 terminate in a ceramic tip 102. The ceramic tips 102 allow water and nutrients to drain into the soil in the planter cups due to surface tension as the soil dries. Other wicking material, such as cloth or felt that swells when the soil is wet (thus limiting the flow of water), may also be used to slowly release water and nutrients to the soil. Advantages of a watering system of this type include a consistent application of moisture and nutrients, for multi-day watering, which is particularly useful when on vacation. The watering tank 92 may be comprised of any size, though one preferred embodiment of the tank holds approximately five gallons. In other embodiments where the drip lines 100 are not capped with a ceramic tip or other wicking material, the drip lines may be bent and clamped or heat sealed. To reach the bottom planter trays of the stackable planter, an additional tubular column 104 may extend from the watering tank cavity 97 to convey water downward through the central portion of the planter trays, from which plastic tubing or drip lines 100 may extend into the planter cups of the trays. The drip lines 100 may tap into the column 104 using standard drip system piercing style connectors. They may also be fused or otherwise affixed to the column 104.

Figure 21:
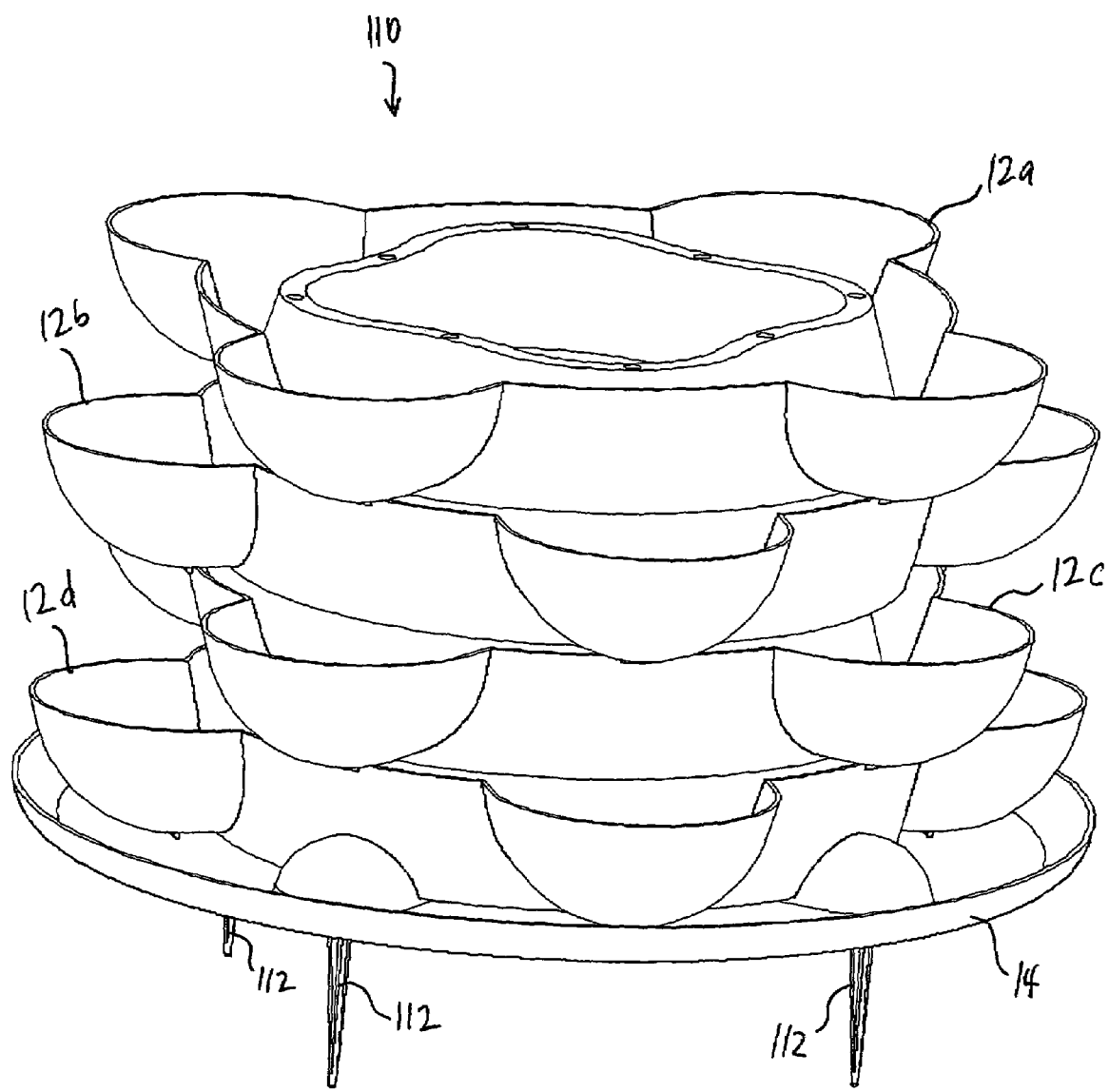
FIG. 21 is a top perspective view of another exemplary embodiment of a stackable planter of the type shown in FIG. 1 with stakes attached to the cart.
Figure 22:
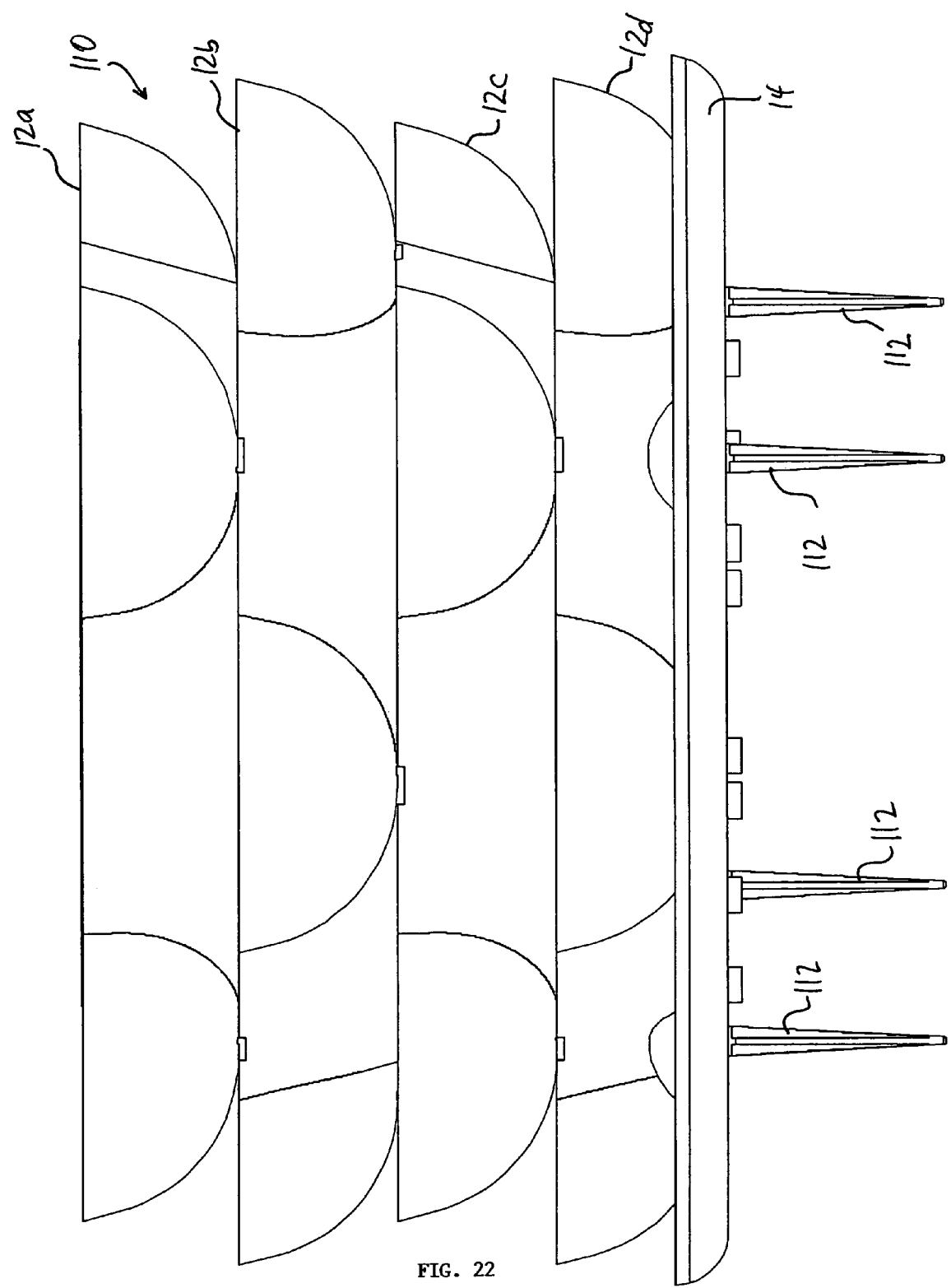
FIG. 22 is a side elevation view of the planter shown in FIG. 21.

FIGS. 21 and 22 illustrate another exemplary embodiment of a stackable planter 110 of the type shown in FIG. 1 with stakes 112 attached to the cart 14. The stackable planter 110 includes four planter trays 12a, 12b, 12c, 12d, stacked on top of a cart 14, as illustrated in FIG. 1. The stakes 112 may be used in place of the wheels 16 as shown in FIGS. 2 and 3. The stakes 112 are useful to prevent movement when constructing the stackable planter 110 in a planting area or on an organic surface, such as a lawn. The stakes 112 may insert into recesses 80, as shown in FIG. 13.

Figure 23:
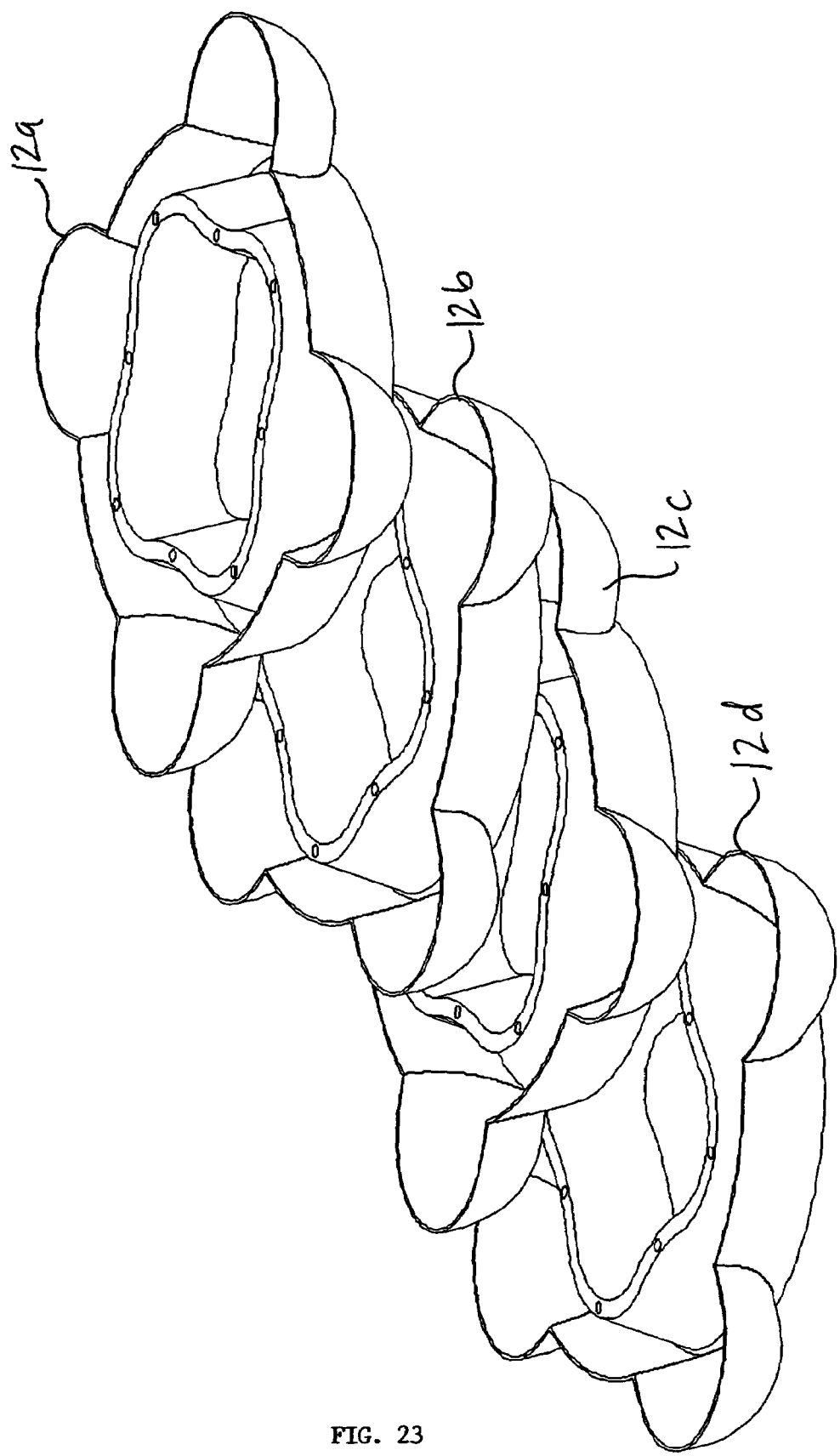
FIG. 23 is a top perspective view of another exemplary embodiment of a stackable planter in accordance with the present invention with four trays shown in an alternative terraced configuration.
Figure 24:
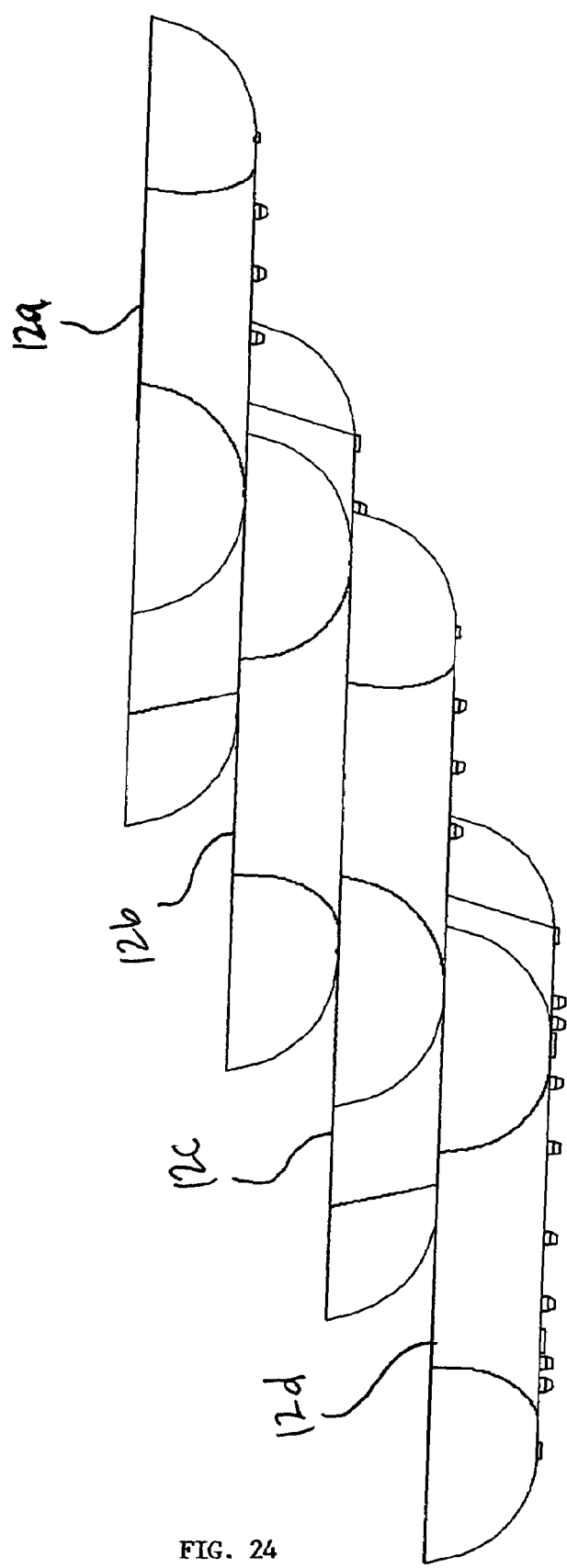
FIG. 24 is a side elevation view of the stackable planter configured as shown in FIG. 23.
Figure 30:
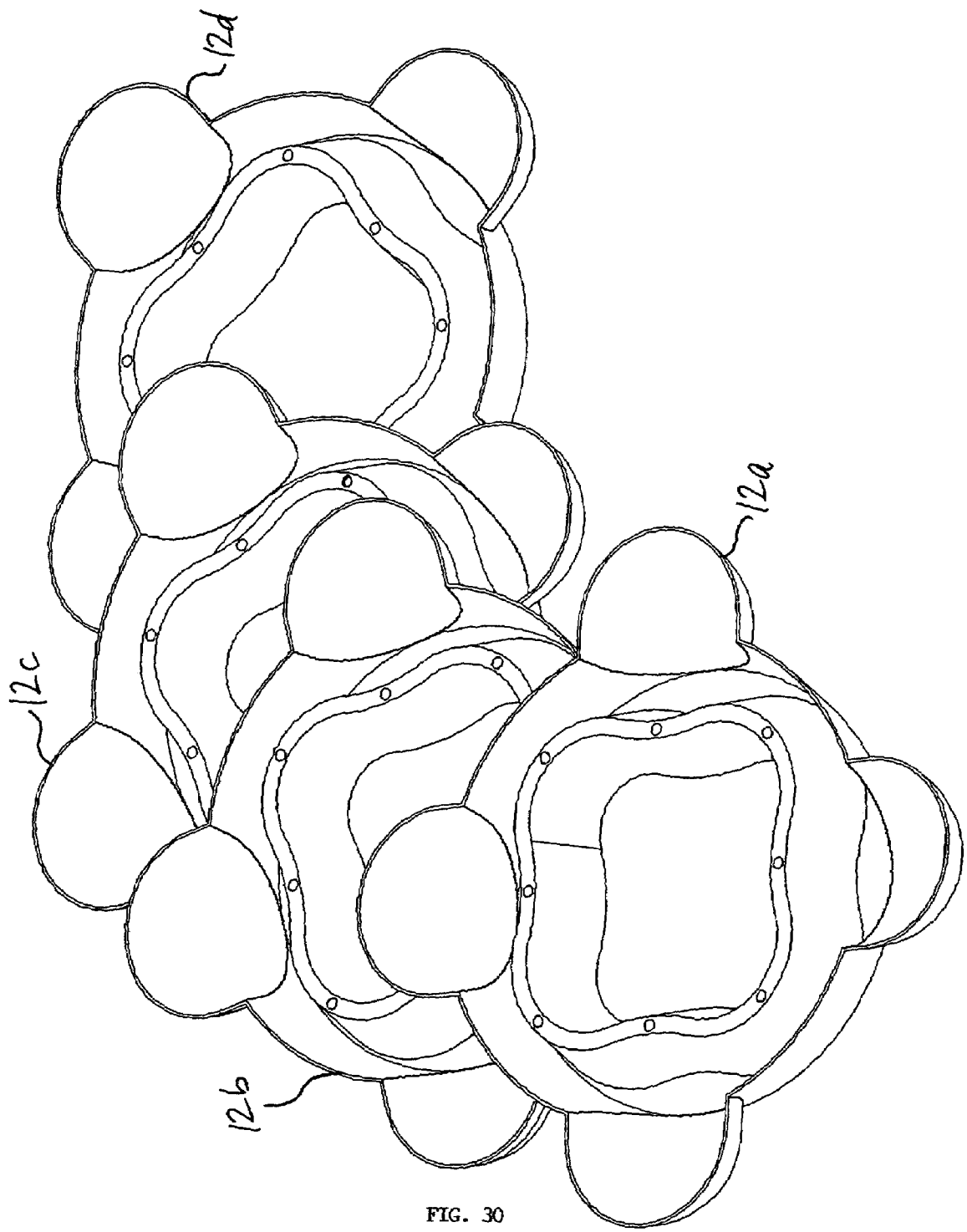
FIG. 30 is a top perspective view of another exemplary embodiment of a stackable planter in accordance with the present invention with four trays shown in a curved terraced configuration.
Figure 31:
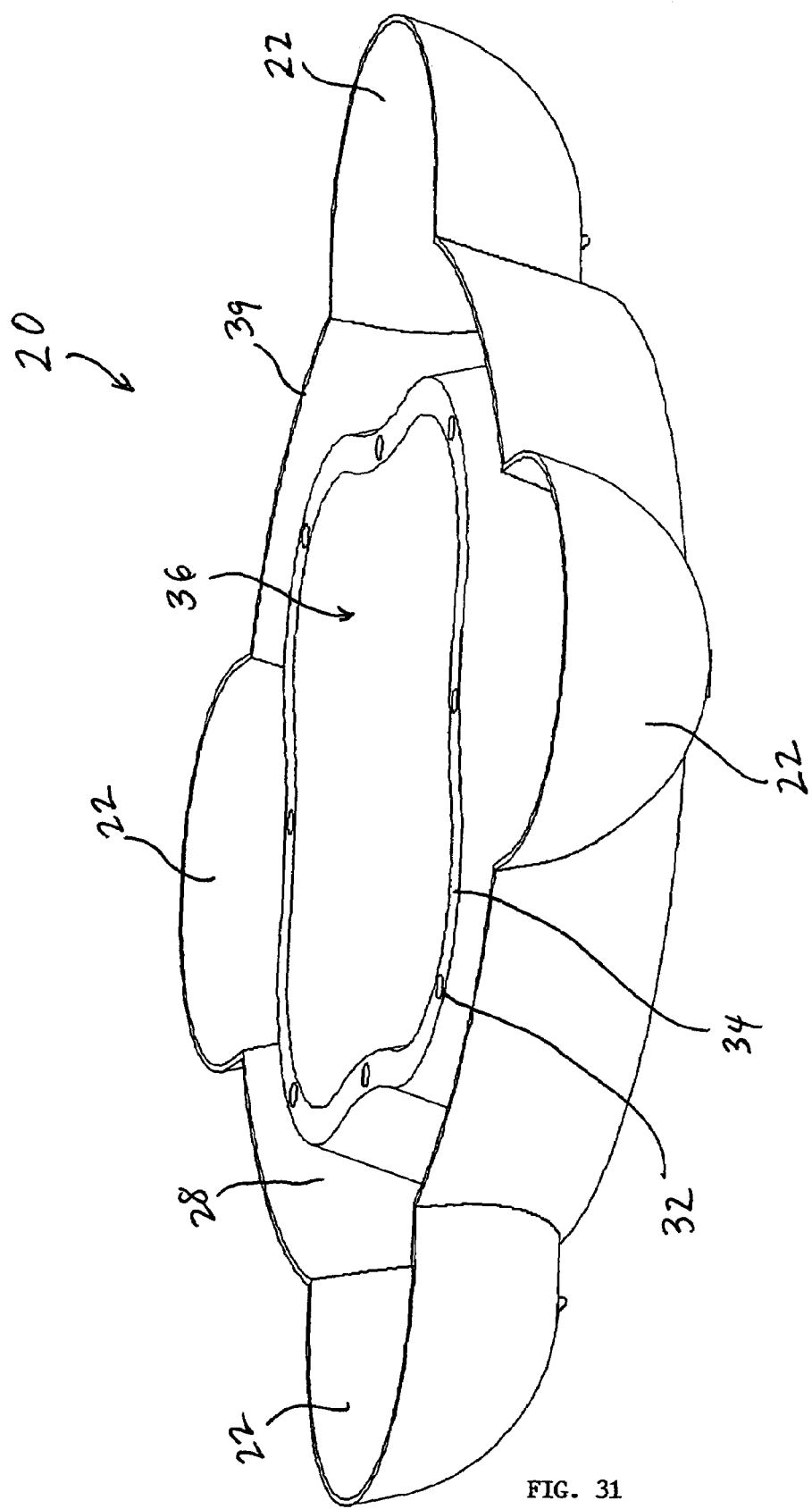
FIG. 31 is another upper perspective view of a planter tray as shown in FIG. 5.

Stackable planters constructed according to the present invention provide a great degree of flexibility when configuring the manner in which the planter trays of the stackable planter are stacked. In embodiments of the invention described above, the planter trays are stacked directly vertically above one another in a column. FIGS. 23 and 24, and FIG. 30, depict additional exemplary embodiments of a stackable planter constructed in accordance with the present invention with four trays shown in an alternative terraced configuration. In FIGS. 23 and 24, the planter trays 12a, 12b, 12c, and 12d are aligned along a straight axis in an upward terraced configuration. The planter trays are affixed to one another by selecting certain of the pins that extend from the bottom of an upper tray to mate with and extend through holes in the inner rib of an adjacent planter tray below it. To achieve a terraced configuration along a straight axis as shown, it is preferred that at least two of the pins from one tray extend into the holes of the below adjacent tray.

A terraced stackable planter may also be configured in a curved configuration as shown in FIG. 30. Again, the planter trays 12a, 12b, 12c, 12d are terraced in an upward extending direction, but follow a curved line. To achieve a curved configuration, one of the pins extending from the bottom of an upper tray is selected to mate with and extend through a hole in the below adjacent tray. Terraced configurations as shown in FIGS. 23–24 and FIG. 30 are particularly useful when assembled on gently sloping ground.

Another advantage of the present invention is that the planter trays 12a, 12b, 12c, 12d, as shown, are sized and configured to fit within one another in a collapsed configuration when the stackable planter is not being used. As shown in FIGS. 25 and 26, the planter trays 12a, 12b, 12c, 12d are configured to nest within one another. In one preferred embodiment, each nested tray adds only one-half inch of vertical height to the collapsed planter. The trays may be collapsed for off-season storage or for moving.

Figure 34:
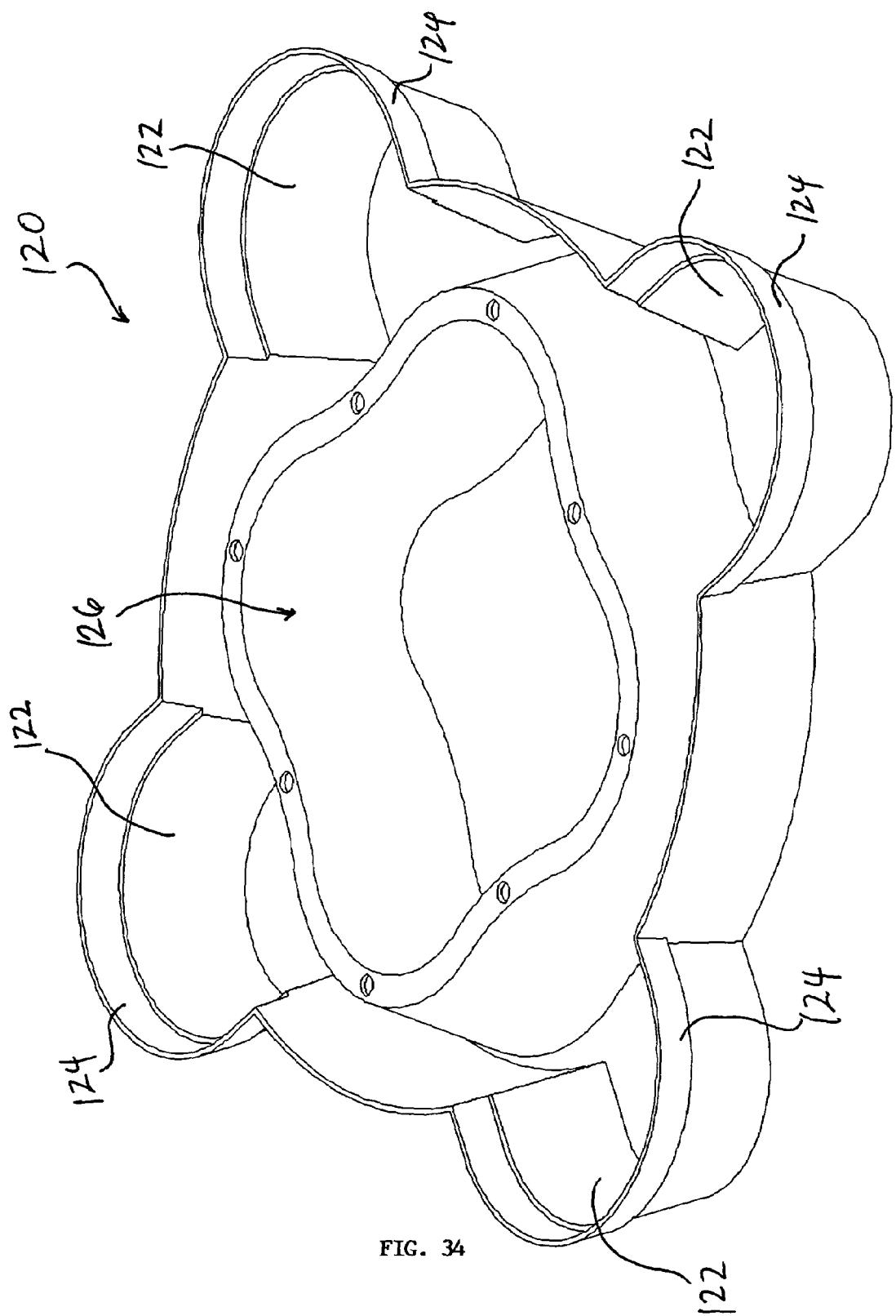
FIG. 34 is a top perspective view of another exemplary form of a planter tray with planter cups having an outer profile appearing as terra cotta pots.
Figure 35:
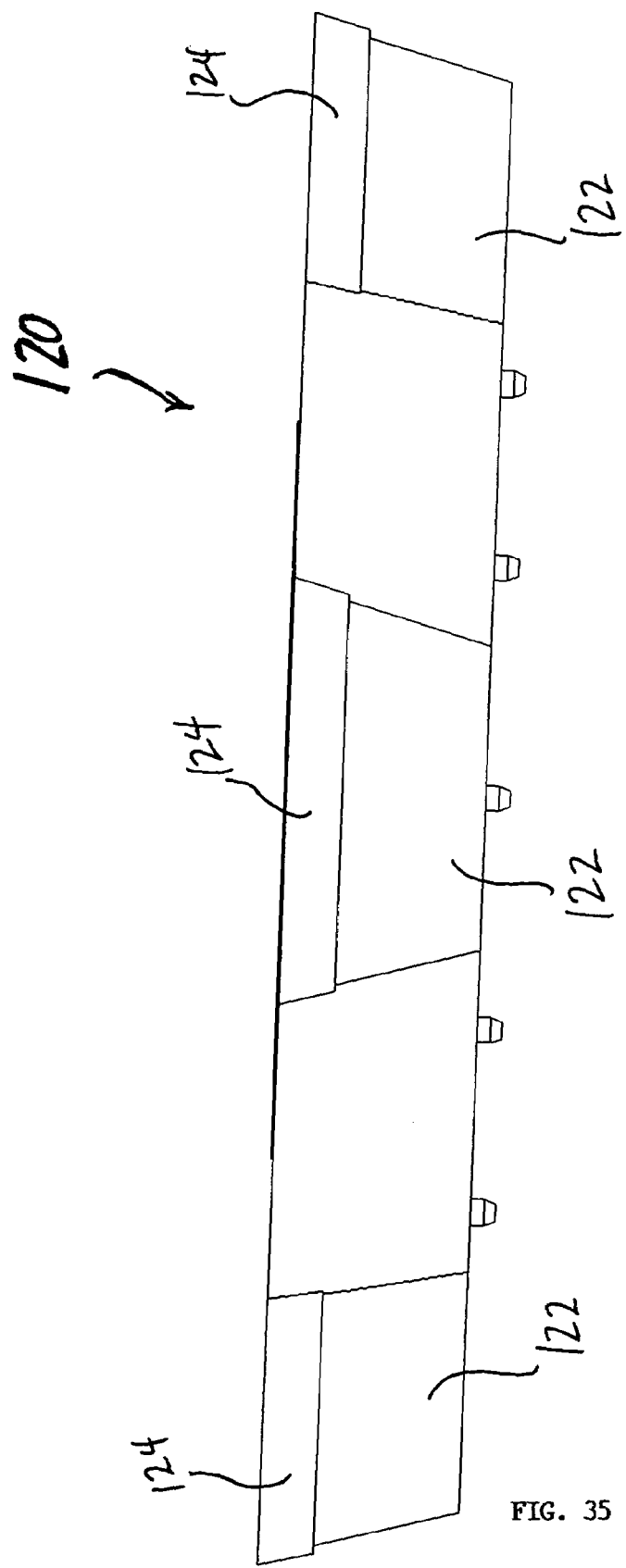
FIG. 35 is a side elevation view of the planter tray shown in FIG. 34.
Figure 36:
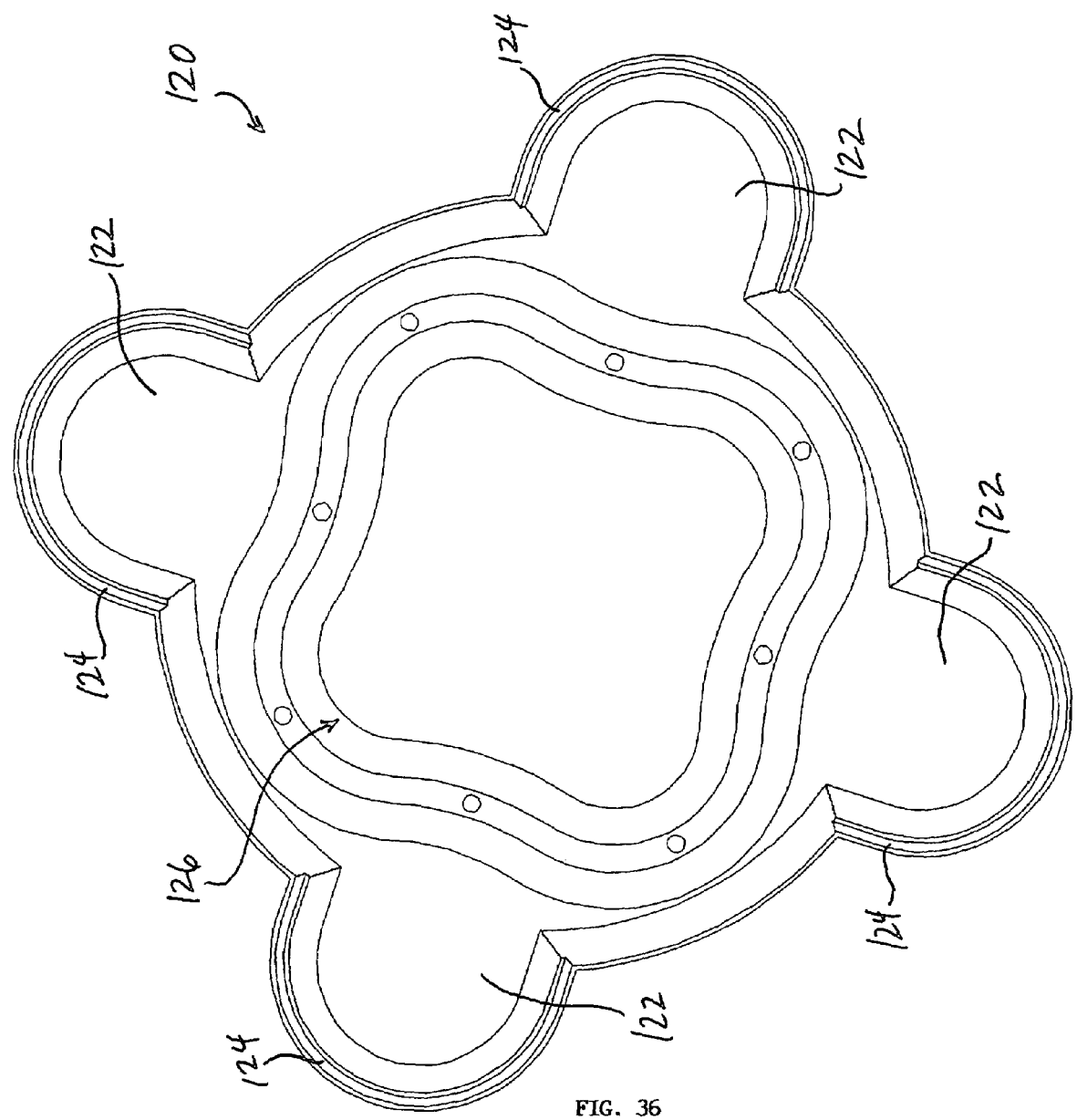
FIG. 36 is a top plan view of the tray shown in FIG. 34.

In the foregoing depictions of stackable planters of the invention, the planter cups are shown having a rounded outer profile. Other embodiments of the invention may use different outer profiles for the planter cups. For example, FIGS. 34–36 depict a planter tray 120 having planter cups 122 having an outer profile appearing as a small terra cotta pot. An upper ridge 124 is formed along the upper periphery of each of the planter cups 122. Other configurations of planter trays may include planter cups having a box-like shape. There is no limit to the shape or configuration of the outer profile of the planter cups, nor to the outer edges of the planter trays.

Moreover, because the inner rib 126 of the planter tray 120 is separate from the outer profile of the tray, the outer profile may be modified without necessarily changing the structural or stacking properties of the inner rib 126.

Figure 37:
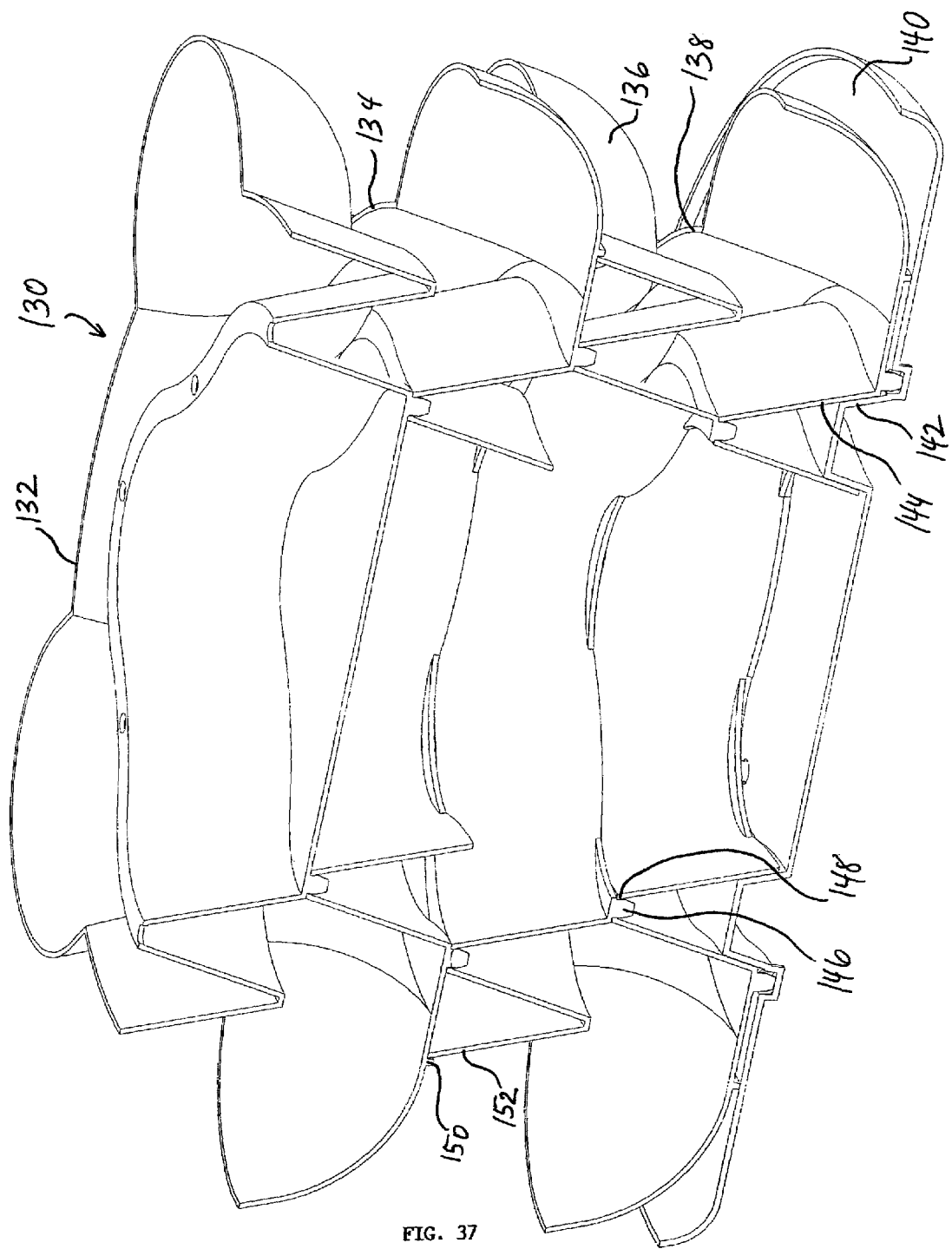
FIG. 37 is a cross-section perspective view of the stackable planter shown in FIG. 1.

FIG. 37 provides a cross-section perspective view of a stackable planter 130 of the type shown in FIG. 1. In this particular implementation, the stackable planter 130 includes a planter tray 132 of the type of tray 20 shown in FIGS. 5–8. The planter tray 132 is located at the top of the stacked trays, though it may be located at any vertical position of the stackable planter 130. The stackable planter 130 includes additional trays 134, 136, and 138 that are of the type of planter tray 40 shown in FIGS. 9–11. The planter trays of the stackable planter 130 are all stacked on top of a cart 140 of the type shown in FIGS. 12–15.

A stackable planter of the form shown in FIG. 37 may be assembled with wheels by using the following method. First, the cart 140 is placed face down on a solid surface. Second, wheels 16 (FIGS. 2–3) or stakes 112 (FIGS. 21–22) are inserted into the recesses 80 (FIG. 13) of the back of the cart 140. Third, the cart 140 is turned over and the first tray 138 is placed onto the cart. The tray 138 should drop completely down onto the cart so that an inner ridge 142 of the cart 140 engages the back surface of the corresponding inner rib 144 of the tray 138. The remaining trays 136, 134, and 132 are stacked on the tray 138, making sure that the pins 146 extending from the bottom of each tray line up with and extend through the appropriate holes 148 defined in the inner rib of the below adjacent tray. This provides support for and aligns the planter trays in a stacked configuration. The planter trays preferably include tabs 150 that align with the outside wall 152 of the adjacent tray below.

The tray 132 has a filled center in which a bottom wall forms a recess for planting small plants. If the tray 132 is moved farther down the stack, (i.e., in the positions occupied by trays 134, 136, or 138), larger plants may be planted in the center portion of the stackable planter 130. After the stackable planter 130 is assembled, soil may be added to the center portion of the planter for planting in the middle of the planter 130.

Figure 38:
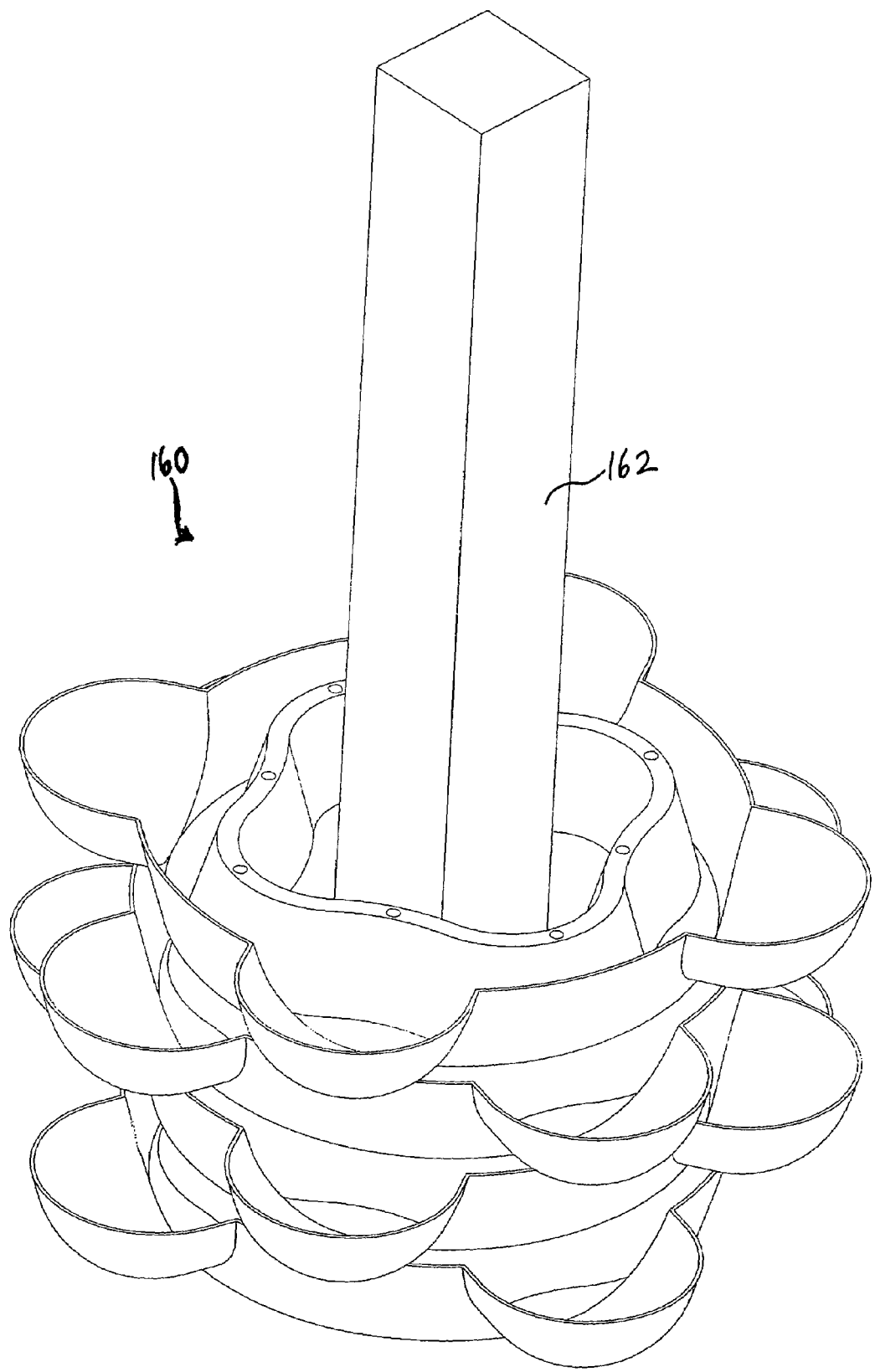
FIG. 38 is a top perspective view of a stackable planter comprised of four trays in a stacked configuration that is used to decorate or conceal a post that extends through the center portion of the trays.

Alternatively, a stackable planter 160 constructed according to the invention may be placed around a post 162, hydrant, or other feature to create a decoration or cosmetic cover, as shown in FIG. 38. In this configuration, planter trays of the type of planter tray 40 (FIGS. 9–12) are used. The planter trays may also be placed or slipped over the top of a young tree to create a planter that protects the tree and limits grass growth around the tree. The planter may later be removed from the tree, by cutting the planter if necessary, as the tree continues to grow. Accordingly, it should be understood that many configurations of stackable planters can be obtained with the present invention, and includes stackable planters with or without an underlying cart or a watering system placed on top thereof.

While several preferred embodiments of the invention have been illustrated and described, it will be appreciated that various changes can be made therein without departing from the spirit and scope of the invention, as defined in the following claims.

The invention claimed is:

1. A stackable planter, comprising:
   a plurality of planter trays, each planter tray having at least one planter cup at a periphery for holding soil and an annular inner rib defining a center portion of the planter tray, the annular inner rib being formed by two opposing walls extending upward from the bottom of the planter tray separated by a space, the opposing walls being joined at the top of the planter tray by an upper surface of the annular inner rib, the opposing walls further forming a channel that is open from the bottom of the planter tray and sized to receive an annular inner rib of another planter tray when the plurality of planter trays are in a collapsed configuration;
   wherein the center portion of at least one planter tray has an aperture extending through the bottom of the planter tray;

wherein the center portion of at least one other planter tray has a bottom wall extending across the center portion of the planter tray; and wherein each of the annular inner ribs of the planter trays have the same shape to enable the planter trays to be stacked in an interchangeable order, such that when stacked, the annular inner ribs of the planter trays define a center portion of the stackable planter having a variable amount of volume that is open from the top of the stackable planter, the depth of the center portion of the stackable planter depending on the location in the stackable planter of a planter tray with a bottom wall across the center portion, whereby one or more plants can be planted in the center portion of the stackable planter.

2. The stackable planter of claim 1, wherein the inner rib is sized to separate the at least one planter cup from the aperture of the center portion.

3. The stackable planter of claim 1, wherein the inner rib is configured to retain soil within the at least one planter cup separate from the center portion.

4. The stackable planter of claim 1, wherein a planter tray of the plurality of planter trays is configured to nest within a second planter tray while in a collapsed condition.

5. The stackable planter of claim 1, wherein the planter cup is configured with an outer profile selected from the group consisting of round, oval, rectangular, diamond shaped, and polygon.

6. The stackable planter of claim 1, wherein a base of at least one planter tray is configured to removably engage an upper portion of a second planter tray.

7. The stackable planter of claim 1, further comprising an engagement mechanism configured to secure the plurality of planter trays in a terraced configuration.

8. The stackable planter of claim 1, wherein the planter tray is further configured to suspend from a support.

9. The stackable planter of claim 1, further comprising a cart configured to support the plurality of planter trays.

10. The stackable planter of claim 9, wherein the cart further comprises a rim.

11. The stackable planter of claim 9, further comprising a plurality of wheels attached to the cart.

12. The stackable planter of claim 9, further comprising a plurality of stakes attached to the cart.

13. The stackable planter of claim 1, further comprising a watering tank configured to fit within the center portion of a planter tray.

14. The stackable planter of claim 13, wherein the watering tank comprises a port configured to distribute water to the planter trays.

15. The stackable planter of claim 13, wherein the watering tank further comprises an opening configured to receive water and a plug for the opening configured to measure nutrients.

16. The stackable planter of claim 13, wherein the watering tank further comprises an extension configured to fit downward through the center portion of at least one planter tray stacked below the watering tank.

17. The stackable planter of claim 1, wherein the bottom wall extending across the center portion of the at least one other planter tray is integrally formed with the planter tray.

* * * * *